US012731187B2

(12) United States Patent
Hisamitsu et al.

(10) Patent No.: US 12,731,187 B2
(45) Date of Patent: Sep. 8, 2026

(54) INFORMATION PROCESSING SYSTEM, INFORMATION PROCESSING METHOD, AND NON-TRANSITORY COMPUTER-READABLE RECORDING MEDIUM

(71) Applicant: FRONTEO, Inc., Tokyo (JP)

(72) Inventors: Toru Hisamitsu, Tokyo (JP); Yuichi Kichikawa, Tokyo (JP); Kazumi Hasuko, Tokyo (JP)

(73) Assignee: FRONTEO, INC., Tokyo (JP)

( * ) Notice: Subject to any disclaimer, the term of this patent is extended or adjusted under 35 U.S.C. 154(b) by 0 days.

(21) Appl. No.: 17/962,733

(22) Filed: Oct. 10, 2022

(65) Prior Publication Data

US 2023/0135438 A1 May 4, 2023

(30) Foreign Application Priority Data

Oct. 28, 2021 (JP) ................................ 2021-176910

(51) Int. Cl.

*G06Q 40/00* (2023.01)
*G06Q 40/04* (2012.01)
*G06Q 40/06* (2012.01)

(52) U.S. Cl.

CPC ............ *G06Q 40/06* (2013.01); *G06Q 40/04* (2013.01)

(58) Field of Classification Search

CPC ......... G06Q 40/00; G06Q 40/04; G06Q 40/06
See application file for complete search history.

(56) References Cited

U.S. PATENT DOCUMENTS

| | | | | |
|---|---|---|---|---|
| 2008/0201246 A1* | 8/2008 | Casey | G06Q 40/00 705/30 |
| 2010/0185467 A1* | 7/2010 | Strnad, II | G06Q 40/02 705/37 |
| 2013/0246310 A1* | 9/2013 | Weiss | G06Q 40/06 705/36 T |

(Continued)

FOREIGN PATENT DOCUMENTS

JP 2021005298 A 1/2021

OTHER PUBLICATIONS

"Study on the Influence of Fully Subscribed Capital System on Shareholders' Capital Contribution,"Z Ke—2018—webofproceedings.org . . . Of the initial capital contribution. The Sub (Year: 2018).*

(Continued)

*Primary Examiner* — Olabode Akintola

(74) *Attorney, Agent, or Firm* — Birch, Stewart, Kolasch & Birch, LLP

(57) ABSTRACT

An information processing system analyzes an influence level for each of a plurality of higher nodes to which a particular one of a plurality of nodes is directly or indirectly linked based on at least one of the capital contribution ratios that is assigned to a path along which one of the capital investment relations from the particular node is traced, by using a capital contribution ratio in the particular node as an index. When the capital contribution ratio of one of two or more of the plurality of higher nodes to which an analysis target node that is a target in analyzing the influence level is linked is in excess of half, the analysis unit analyzes the one higher node the capital contribution ratio of which is in excess of half to be effectively controlling the analysis target node.

11 Claims, 18 Drawing Sheets

(56) References Cited

U.S. PATENT DOCUMENTS

| | | | | |
|---|---|---|---|---|
| 2013/0318005 | A1* | 11/2013 | Bass | H04W 4/80 705/36 R |
| 2014/0279540 | A1* | 9/2014 | Jackson | G06Q 20/023 705/44 |

OTHER PUBLICATIONS

Mizuno T, Doi S, Kurizaki S (2020) "The power of corporate control in the global ownership network". PLoS ONE 15(8): e0237862. https://doi.org/10.1371/journal.pone.0237862.

* cited by examiner

100
SERVER SYSTEM
110
PROCESSING UNIT
120
MEMORY UNIT
ENTITY NETWORK OBTAINING UNIT
111
121
ENTITY NETWORK
INFLUENCE LEVEL CALCULATION UNIT
112
130
PRESENTATION PROCESSING UNIT
113
COMMUNICATIONS UNIT

200
TERMINAL DEVICE
210
220
MEMORY UNIT
230
COMMUNICATIONS UNIT
PROCESSING UNIT
240
DISPLAY UNIT
250
OPERATION UNIT

NPI of B in A is 2/3

NPI of B in A is 1

Indirect Shareholding Ratio (ISH) of B in A
= 30% + 0.5×30% = 45%

Indirect Shareholding Ratio (ISH) of B in A
= 30% + 1×30% = 60%

STACK S
PATH SET P
F1
F2
F3
F4
F5

STACK S
PATH SET P
F6
F7
F8

STACK S
PATH SET P
F9
F10
F11
F12
0.4
0.3
0.6
0.5
1
. . .

STACK S
PATH SET P
F13
F14

FIG. 12

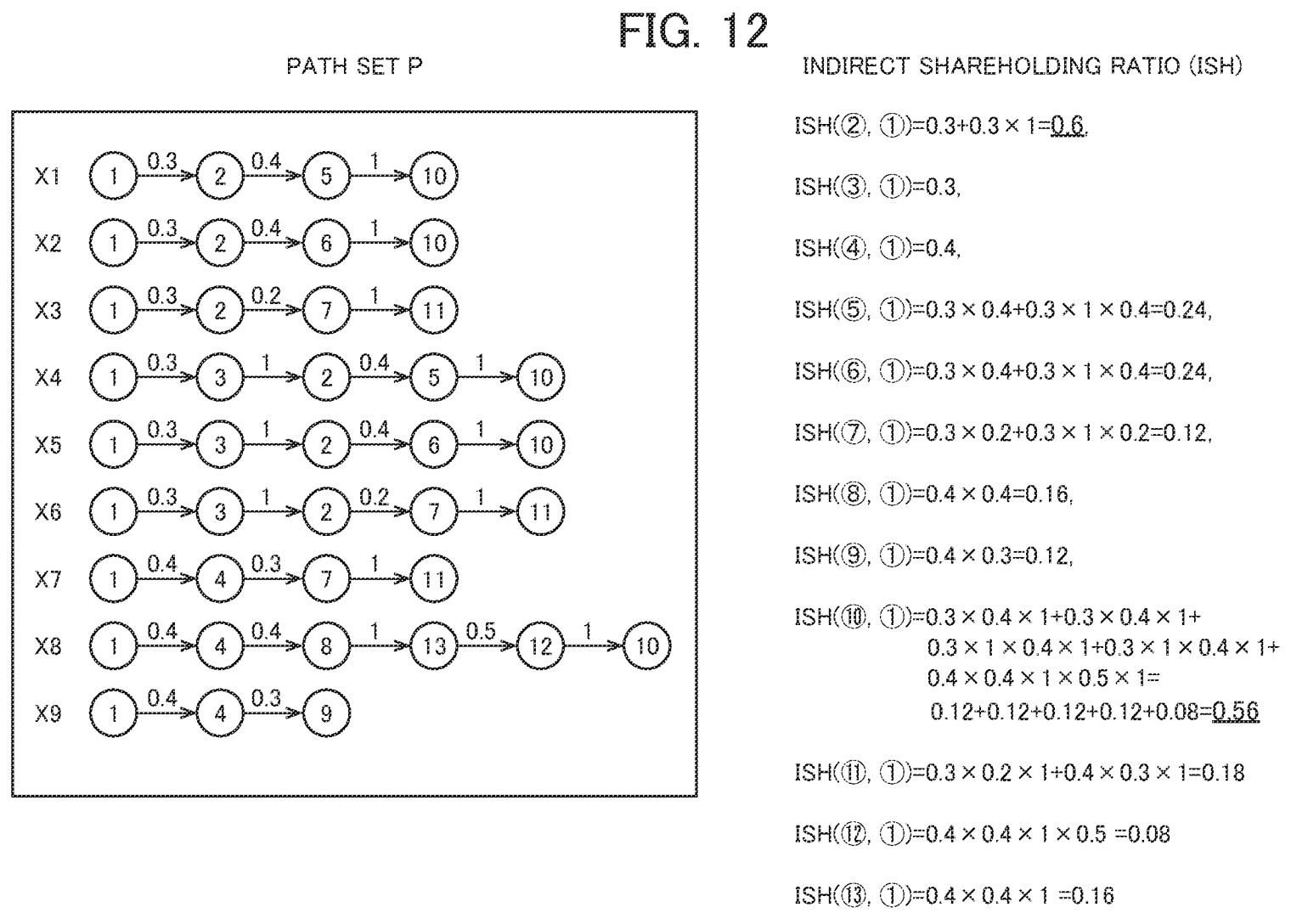

PATH SET P

X1 ① →0.3→ ② →0.4→ ⑤ →1→ ⑩

X2 ① →0.3→ ② →0.4→ ⑥ →1→ ⑩

X3 ① →0.3→ ② →0.2→ ⑦ →1→ ⑪

X4 ① →0.3→ ③ →1→ ② →0.4→ ⑤ →1→ ⑩

X5 ① →0.3→ ③ →1→ ② →0.4→ ⑥ →1→ ⑩

X6 ① →0.3→ ③ →1→ ② →0.2→ ⑦ →1→ ⑪

X7 ① →0.4→ ④ →0.3→ ⑦ →1→ ⑪

X8 ① →0.4→ ④ →0.4→ ⑧ →1→ ⑬ →0.5→ ⑫ →1→ ⑩

X9 ① →0.4→ ④ →0.3→ ⑨

INDIRECT SHAREHOLDING RATIO (ISH)

ISH(②, ①)=0.3+0.3 × 1=0.6,

ISH(③, ①)=0.3,

ISH(④, ①)=0.4,

ISH(⑤, ①)=0.3 × 0.4+0.3 × 1 × 0.4=0.24,

ISH(⑥, ①)=0.3 × 0.4+0.3 × 1 × 0.4=0.24,

ISH(⑦, ①)=0.3 × 0.2+0.3 × 1 × 0.2=0.12,

ISH(⑧, ①)=0.4 × 0.4=0.16,

ISH(⑨, ①)=0.4 × 0.3=0.12,

ISH(⑩, ①)=0.3 × 0.4 × 1+0.3 × 0.4 × 1+
0.3 × 1 × 0.4 × 1+0.3 × 1 × 0.4 × 1+
0.4 × 0.4 × 1 × 0.5 × 1=
0.12+0.12+0.12+0.12+0.08=0.56

ISH(⑪, ①)=0.3 × 0.2 × 1+0.4 × 0.3 × 1=0.18

ISH(⑫, ①)=0.4 × 0.4 × 1 × 0.5 =0.08

ISH(⑬, ①)=0.4 × 0.4 × 1 =0.16

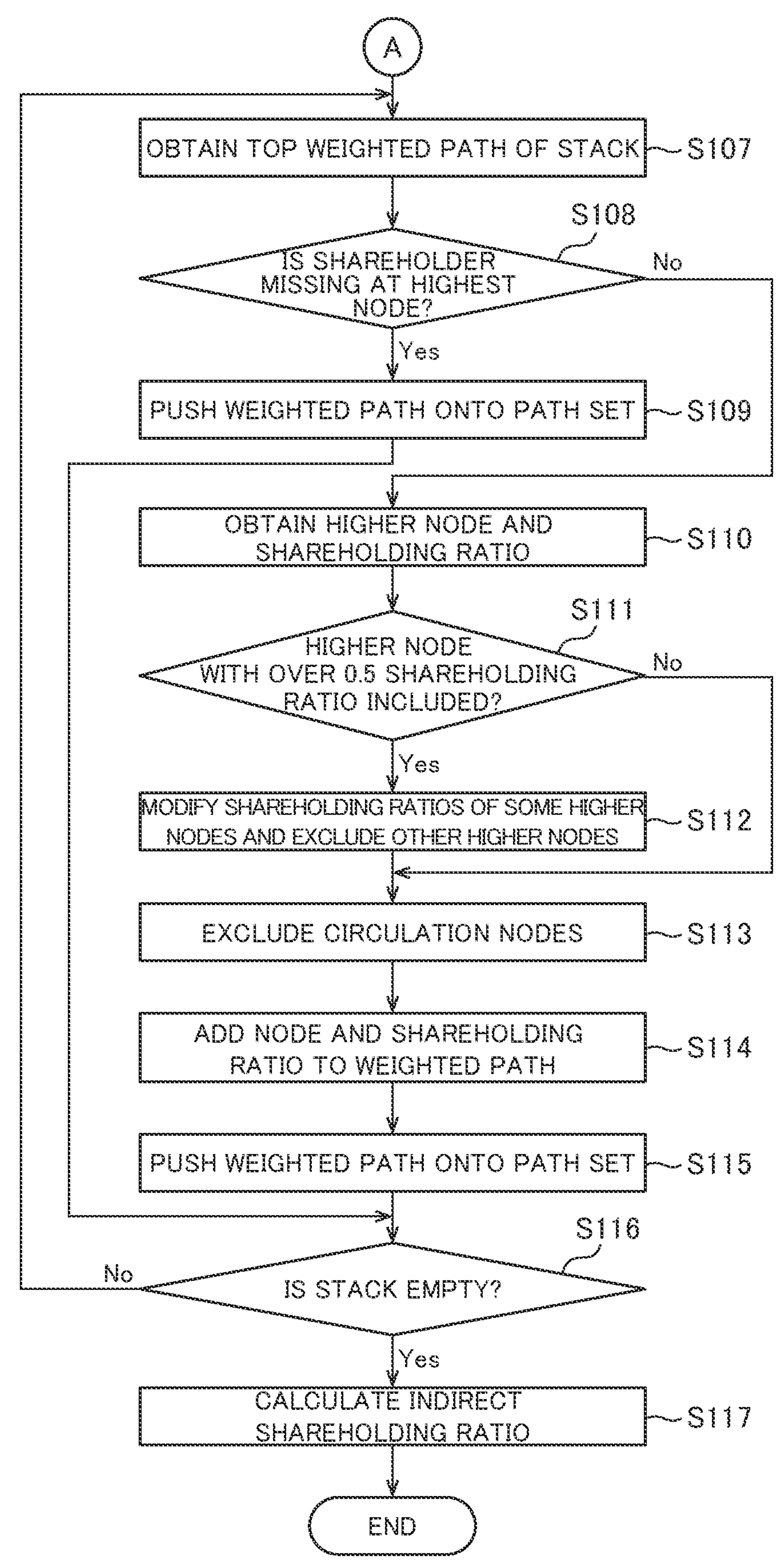
FIG. 14
A
OBTAIN TOP WEIGHTED PATH OF STACK
S107
S108
IS SHAREHOLDER MISSING AT HIGHEST NODE?
No
Yes
PUSH WEIGHTED PATH ONTO PATH SET
S109
OBTAIN HIGHER NODE AND SHAREHOLDING RATIO
S110
S111
HIGHER NODE WITH OVER 0.5 SHAREHOLDING RATIO INCLUDED?
No
Yes
MODIFY SHAREHOLDING RATIOS OF SOME HIGHER NODES AND EXCLUDE OTHER HIGHER NODES
S112
EXCLUDE CIRCULATION NODES
S113
ADD NODE AND SHAREHOLDING RATIO TO WEIGHTED PATH
S114
PUSH WEIGHTED PATH ONTO PATH SET
S115
S116
No
IS STACK EMPTY?
Yes
CALCULATE INDIRECT SHAREHOLDING RATIO
S117
END $\alpha$=0.5

$E_1$={①}

$E_2$={②,③,④}

$E_3$={⑤,⑥,⑧}

$E_4$={⑪}

$E_5$={⑭}

OUTPUT=
{②,③,④,⑤,⑥,⑧,⑪,⑭}

$\alpha$=1/3

$E_1$={①}

$E_2$={②,③,④}

$E_3$={⑤,⑥,⑦,⑧}

$E_4$={⑨,⑯,⑩,⑪}

$E_5$={⑫,⑬,⑭}

INFORMATION PROCESSING SYSTEM, INFORMATION PROCESSING METHOD, AND NON-TRANSITORY COMPUTER-READABLE RECORDING MEDIUM

CROSS-REFERENCE TO RELATED APPLICATION

The present application claims priority from Japanese Application JP2021-176910 filed on Oct. 28, 2021, the content to which is hereby incorporated by reference into this application.

BACKGROUND OF THE INVENTION

1. Field of the Invention

The present invention relates to information processing systems, information processing methods, and non-transitory computer-readable recording mediums.

2. Description of the Related Art

Conventional techniques have been known that evaluate the influential power that an entity has on another entity through quantification using a shareholding ratio. Examples of an entity include countries, businesses, and people.

"Mizuno T, Doi S, Kurizaki S (2020) The power of corporate control in the global ownership network. PLoS ONE 15(8): e0237862. https://doi.org/10.1371/journal-.pone.0237862" proposes a technique of quantifying the influential power by simply adding up shareholding ratios in cases where an entity has indirect influential power on another entity. Japanese Unexamined Patent Application Publication, Tokukai, No. 2021-005298 proposes another technique of quantifying the influential power between entities, by using the network power index (NPI).

For instance, if entities form an entity-connecting network that has a multilayer structure, it is difficult to properly evaluate the influential power by the technique of quantifying influential power between entities through simple addition of shareholding ratios. It is also difficult to properly evaluate the influential power by the technique of quantifying influential power between entities using the NPI. For instance, because the NPI employs a unique index, it is difficult to describe relevance between the NPI value and the influence level between entities if the NPI value is not 1. In addition, the NPI-based technique is not capable of analyzing the influence level of an entity that effectively controls another entity in the same entity network.

The present disclosure, in some aspects thereof, has an object to provide, for example, an information processing system, an information processing method, and a non-transitory computer-readable recording medium that are capable of properly evaluating influence levels between entities.

The present disclosure, in an aspect thereof, is directed to an information processing system including: an obtaining unit configured to obtain an entity network representing mutual capital investment relations and mutual capital contribution ratios among a plurality of nodes corresponding to a plurality of entities; and an analysis unit configured to analyze an influence level for each of a plurality of higher nodes to which a particular one of the plurality of nodes is directly or indirectly linked based on at least one of the capital contribution ratios that is assigned to a path along which one of the capital investment relations from the particular node is traced, by using the capital contribution ratio in the particular node as an index, wherein when the capital contribution ratio of one of two or more of the plurality of higher nodes to which an analysis target node that is a target in analyzing the influence level is linked is in excess of half, the analysis unit analyzes the one higher node the capital contribution ratio of which is in excess of half to be effectively controlling the analysis target node.

BRIEF DESCRIPTION OF THE DRAWINGS

FIG. 12 is a diagram illustrating an exemplary method of calculating an indirect shareholding ratio.

FIG. 14 is a continuation (flow chart) to FIG. 13.

DETAILED DESCRIPTION OF THE INVENTION

Figure 1:
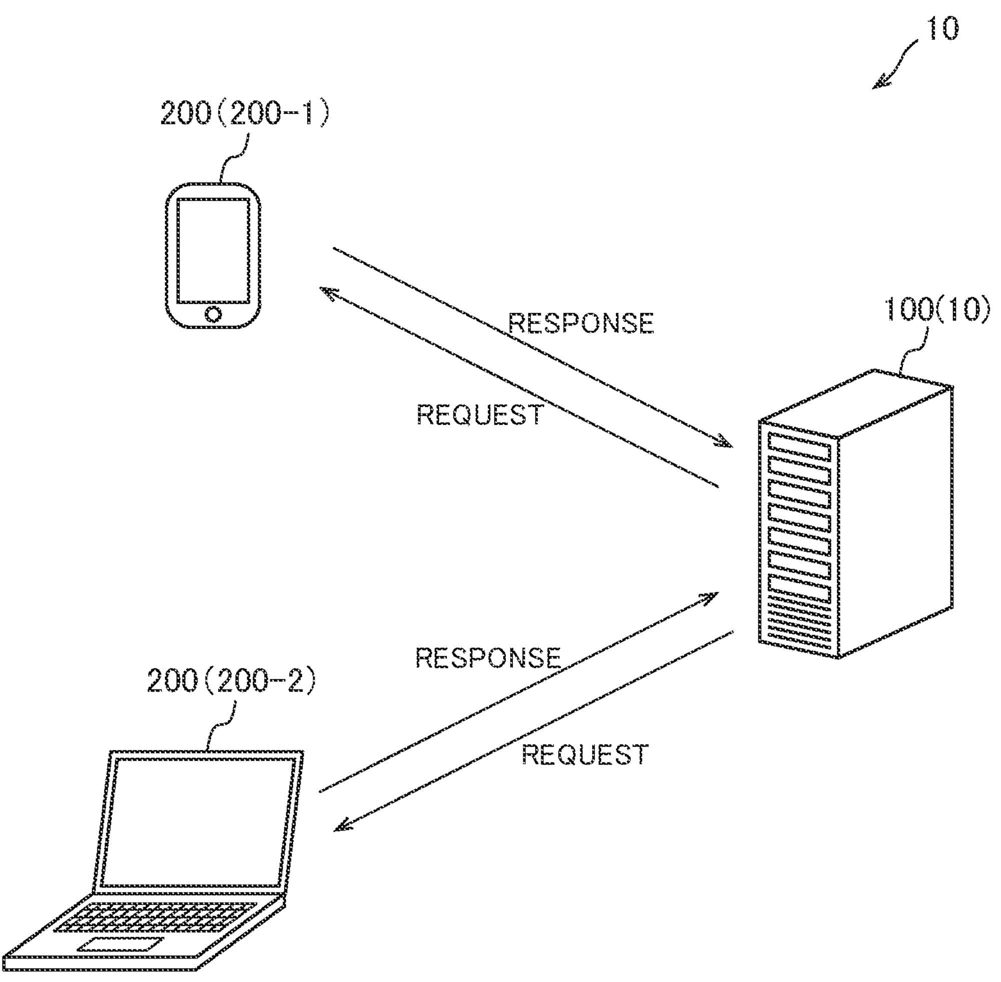
FIG. 1 shows an exemplary structure of a system including an information processing system.

The following will describe the present embodiment with reference to drawings. Identical and equivalent elements in the drawings are denoted by the same reference numerals, and description thereof is not repeated. The scope of the present invention is not unreasonably limited by the present embodiment described below. Not all the members described in the present embodiment are essential to the present disclosure.

1. OSINT System 1.1 Example of System Structure

FIG. 1 shows an exemplary structure of a system including an information processing system 10 in accordance with the present embodiment. The system in accordance with the present embodiment includes a server system 100 and a terminal device 200. The structure of the system including the information processing system 10 is not necessarily limited to the example shown in FIG. 1 and may be modified in various manners, for example, by omitting some parts of the structure or by including an additional structure. For instance, FIG. 1 shows two terminal devices 200-1 and 200-2 as the terminal device 200. Alternatively, there may be provided only one terminal device 200 or three or more terminal devices 200. The same description applies to FIG. 2 and FIG. 3 (detailed below) regarding variations including the omission of parts of the structure and the inclusion of an additional structure.

The information processing system 10 in accordance with the present embodiment is an equivalent of, for example, the server system 100. The server system 100 is an equivalent of a computer. The technique in accordance with the present embodiment is however not necessarily limited to this example. The functions of the information processing system 10 may be provided by a distributed system that includes the server system 100 and other apparatus. For instance, the information processing system 10 in accordance with the present embodiment may be implemented by distributed processing between the server system 100 and the terminal device 200. The following description will focus on examples where the information processing system 10 is the server system 100.

The server system 100 may include a single server or a plurality of servers. For instance, the server system 100 may include a database server and an application server. The database server may contain entity networks (which will be described later) and other various data. The application server may perform variations processes in accordance with the present embodiment. The plurality of servers may be physical servers or virtual servers. When a virtual server is used, the virtual server may be provided either by a single physical server or by a plurality of physical servers in a distributed manner. The specific structure of the server system 100 can have many variations in the present embodiment as described here.

The terminal device 200 is used by a user of the information processing system 10. The terminal device 200 may be a PC (personal computer), a mobile terminal such as a smartphone, or any other like apparatus.

The server system 100 is connected to the terminal device 200-1 and the terminal device 200-2, for example, over a network. The terminal device 200-1 and the terminal device 200-2 will be simply referred to as the terminal device 200 throughout the following description when there is no need to distinguish between multiple terminal devices. The network in this context is, for example, a public communications network such as the Internet and may be, for example, a LAN (local area network).

The information processing system 10 in accordance with the present embodiment is an OSINT (open source intelligence) system, for example, for collecting and analyzing data related to a target by using, for example, open information. The open information in this context includes various information that is legally available and widely accessible, such as securities reports, inter-industry relations tables, governments' official announcements, and news reports on countries and businesses. The information processing system 10 in accordance with the present embodiment is not necessarily limited to an OSINT system.

The server system 100 generates nodes with various attributes on the basis of open information. Each node represents a given entity and may in this context be a person, a business, or a country. Attributes are, for example, the information determined on the basis of open information and include information on the entity including information on shareholding ratios. The attributes may include the entity's nationality, business field, sales, number of employees, board members, traded goods, and various other information.

When a given node has an attribute associated with another node, the two nodes are linked together by a directional edge. As an example, when a given entity has a shareholder that is another entity, the two nodes representing the respective entities are linked together by an edge representing a shareholding ratio. An edge in this context has directionality from an entity that receives influence to an entity that gives influence. The edge has, for example, directionality from an entity that receives investment to an entity that makes the investment.

According to the technique in accordance with the present embodiment, the server system 100 obtains an entity network composed of a plurality of nodes, each representing an entity, that are linked by attribute-based directional edges. In other words, the entity network is a directed graph. The server system 100 performs analysis based on the entity network and implements a process of presenting results of the analysis. For instance, the terminal device 200 is used by a user of a service provided by an OSINT system. For instance, the user requests the server system 100 (information processing system 10) to perform some analysis by using the terminal device 200. The server system 100 performs analysis based on the entity network and feeds the results of the analysis to the terminal device 200 as a response.

Figure 2:
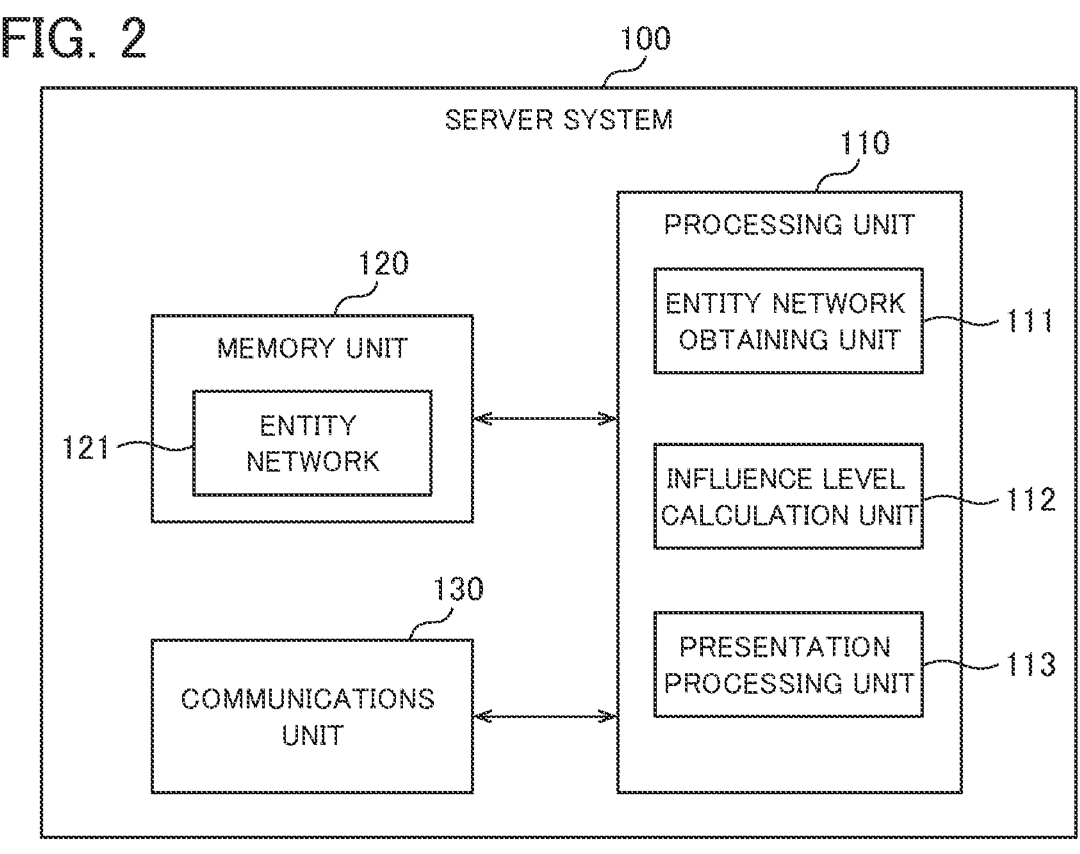
FIG. 2 shows an exemplary structure of a server system.

FIG. 2 is a detailed block diagram of an exemplary structure of the server system 100. The server system 100 includes, for example, a processing unit 110, a memory unit 120, and a communications unit 130.

The processing unit 110 in accordance with the present embodiment includes prescribed hardware. The hardware may include either one or both of a digital signal processing circuit and an analog signal processing circuit. For instance, the hardware may include one or more circuit elements or devices mounted on a circuit board. Each circuit device is, for example, an IC (integrated circuit) chip or an FPGA (field-programmable gate array). Each circuit element is, for example, a resistor or a capacitor.

The processing unit 110 may be provided by one or more processors. The server system 100 in accordance with the present embodiment includes, for example, an information-containing memory and a processor that operates on the basis of the information stored in the memory. The information is, for example, programs and various data. The processor includes hardware. The processor may be any processor including a CPU (central processing unit), a GPU (graphics processing unit), and a DSP (digital signal processor). The memory may be, for example, a semiconductor memory such as a SRAM (static random access memory), a DRAM (dynamic random access memory), or a flash memory; a register; a magnetic storage device such as a hard disk drive (HDD); or an optical storage device such as an optical disc drive. For instance, the memory contains computer-readable instructions, so that the processor can execute the instructions to provide the functions of the processing unit 110. These instructions may be a set of instructions contained in a program or instructions for instructing the processor hardware circuit to operate.

The processing unit 110 in accordance with the example of FIG. 2 includes, for example, an entity network obtaining unit 111, an influence level calculation unit 112, and a presentation processing unit 113.

The entity network obtaining unit 111 obtains an entity network 121. For instance, the entity network obtaining unit 111 may generate the entity network 121 on the basis of open information. The entity network obtaining unit 111 stores the generated entity network 121 in the memory unit 120. The entity network obtaining unit 111, upon performing a process in accordance with the present embodiment, obtains the entity network 121 stored in the memory unit 120.

The entity network 121 may be generated by a system other than the information processing system 10 in accordance with the present embodiment. When this is the case, the entity network obtaining unit 111 may obtain an entity network from another system via the communications unit 130.

The entity network obtaining unit 111 obtains, as the entity network 121, for example, a network of entities interconnected by capital investment relations. The entity network 121 includes plurality of entities. Each entity corresponds to a node as described above. Nodes are connected by edges on the basis of capital investment relations. In addition, each edge is assigned a capital contribution ratio. The capital contribution ratio represents a shareholding ratio. Information on the shareholding ratio can also obtained on the basis of the open information described above.

The influence level calculation unit 112 implements an influence level calculation process of calculating the influence level of a given entity on another entity on the basis of the entity network 121. The influence level calculation unit 112 is an equivalent of an analysis unit.

The presentation processing unit 113 performs a process of causing the terminal device 200 to display a presentation screen that presents, for example, the links between nodes in the entity network 121, the capital contribution ratios assigned to the edges, and indirect shareholding ratios corresponding to the respective nodes. The presentation processing unit 113 is an equivalent of a display controlling unit.

The memory unit 120 is a working area for the processing unit 110 and contains various information. The memory unit 120 may be any memory device including a semiconductor memory such as an SRAM, a DRAM, a ROM, or a flash memory; a register; a magnetic storage device such as a hard disk drive; or an optical storage device such as an optical disc drive.

The memory unit 120 contains, for example, the entity network 121 obtained by the entity network obtaining unit 111. The memory unit 120 may contain various information related to the processes in accordance with the present embodiment.

The communications unit 130 is an interface for performing communications over a network and includes, for example, an antenna, an RF (radio frequency) circuit, and a baseband circuit. The communications unit 130 may operate under the control of the processing unit 110 and may include a communications controlling processor other than the processing unit 110. The communications unit 130 is an interface for performing communications in accordance with, for example, the TCP/IP (transmission control protocol/internet protocol). The specific communications scheme may have many variations.

Figure 3:
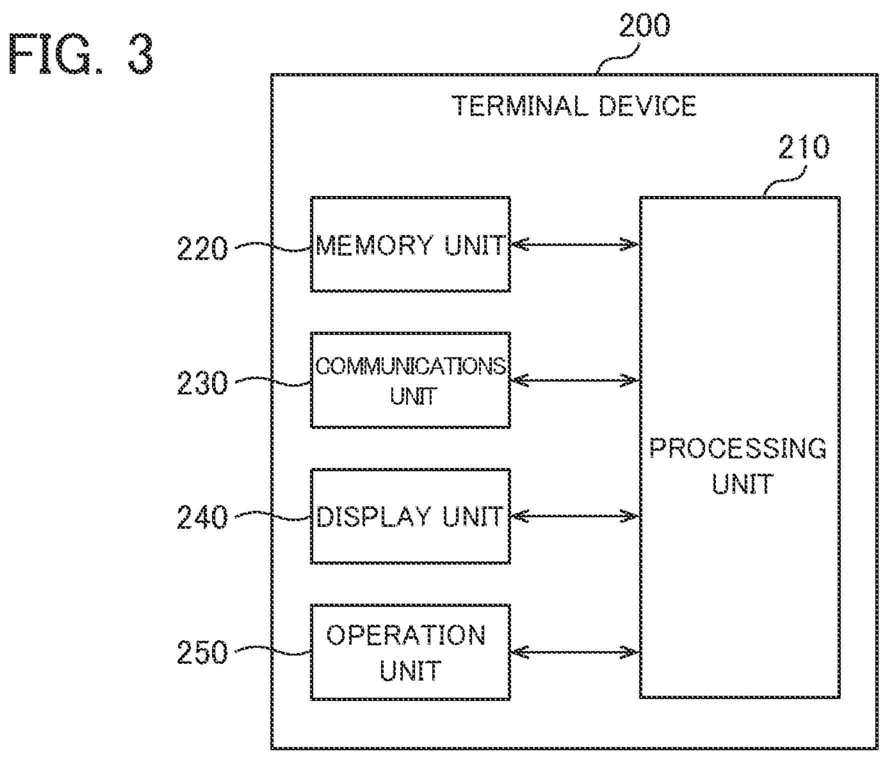
FIG. 3 shows an exemplary structure of a terminal device.

FIG. 3 is a detailed block diagram of an exemplary structure of the terminal device 200. The terminal device 200 includes a processing unit 210, a memory unit 220, a communications unit 230, a display unit 240, and an operation unit 250.

The processing unit 210 includes hardware including either one or both of a digital signal processing circuit and an analog signal processing circuit. The processing unit 210 may be provided by a processor. This processor may be any processor including a CPU, a GPU, and a DSP. The processor executes the instructions stored in the memory of the terminal device 200 to provide the functions of the processing unit 210.

The memory unit 220 is a working area for the processing unit 210 and provided by any memory such as an SRAM, a DRAM, or a ROM.

The communications unit 230 is an interface for performing communications over a network and includes, for example, an antenna, an RF circuit, and a baseband circuit. The communications unit 230 communicates with the server system 100 over, for example, a network.

The display unit 240 is an interface for displaying various information and may be a liquid crystal display device, an OLED display device, or a display device that operates under any other scheme. The display unit 240 displays, for example, a presentation screen (detailed later) under the control of a presentation processing unit 1113 of the server system 100.

The operation unit 250 may be, for example, a button on the terminal device 200. The display unit 240 and the operation unit 250 may be combined to form a touch panel.

1.2 Specific Examples of Service

A description will be given next of specific examples of the service provided by the information processing system 10 (OSINT system). Business ownership stake network analysis is taken below as an example of specific services.

Figure 4:
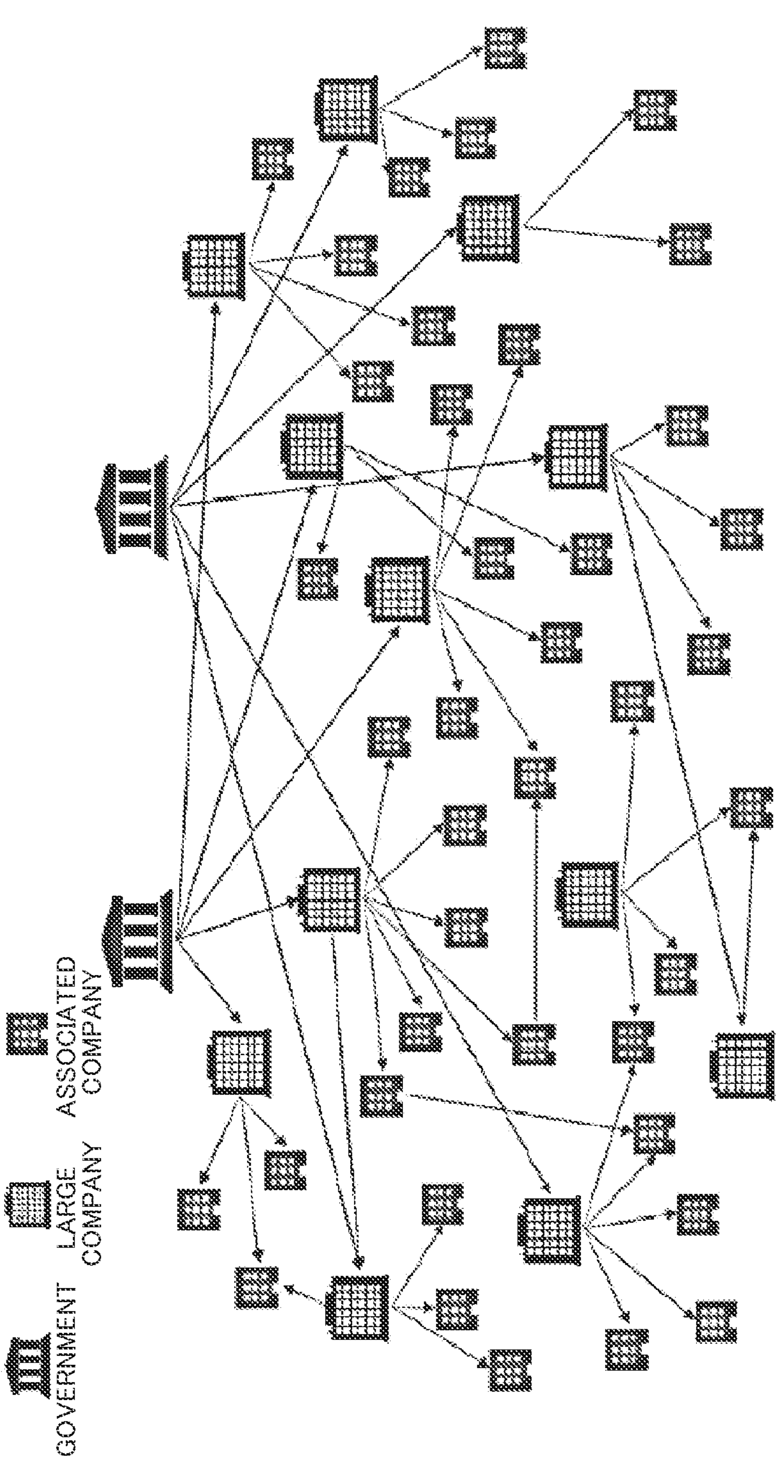
FIG. 4 is a diagram of a business ownership stake network analysis.

FIG. 4 is a diagram of business ownership stake network analysis and shows an exemplary entity network representing capital investment relations. A network is formed that represents capital investment relations between, for example, countries and businesses on the basis of the information representative of the shareholders and their capital contribution ratios found in open information as shown in FIG. 4.

The influence level calculation unit 112 may analyze, for example, the influence level that various countries and businesses have on another business. The influence level in this context indicates controlling power exercised through investment. Specific examples of the influence level calculation process will be detailed later.

For instance, it is possible to approximately learn what controlling power a particular country has on the supply of products in a given industry sector, by finding the influence level that the country has on businesses in that industry sector. It is, for example, possible to evaluate the influence of a critical domestic incident on the stable supply of a product. The influence level calculation unit 112 may find the influential power that individual countries have on global businesses. In this manner, it is possible to learn power balance between countries. It is also possible to learn about how the power balance is changing, by finding temporal changes of the influential power that individual countries have on global businesses.

Alternatively, the influence level calculation unit 112 may find the influential power that a country has on a business related to infrastructure in a given country. The infrastructure-related business may be a business related to electric power or another form of energy or a business that provides a mobile communications network. In this manner, it becomes possible to evaluate the risk of the infrastructure stopping functioning. The influence level calculation unit 112 may alternatively find the influential power on a business that owns technology that can be diverted to military use. In this manner, it becomes possible to detect security risk.

The influence level calculation unit 112 may find changes that may occur in the influence level of a country or business when they take a particular course of action. As an example, in the wake of a shift in the foreign policy of a given country, it is possible to simulate the influence of the new foreign policy on other countries, by calculating the influence level before and after the shift.

By using the influence level calculation unit 112, it also becomes possible to analyze complex capital investment relations, which humans would find hard to detect, through business ownership stake network analysis.

Countries, businesses, and important people have formed networks that are ever more global and complex than humans can analyze manually. In contrast, the OSINT system described above is capable of the analysis of, for example, networks representing business controls through investment. Since the OSINT system is capable of deciphering complex relationships, the government and businesses can, for example, devise an optimal strategy.

2. Details of Processes

The following will describe processes in detail in accordance with the present embodiment. A technique in accordance with the present embodiment refers to business ownership stake network analysis in the narrow sense of the term and is a technique that is applicable to any technique other than business ownership stake network analysis.

2.1 Basics of Calculation of Influence Level

Figure 5A:
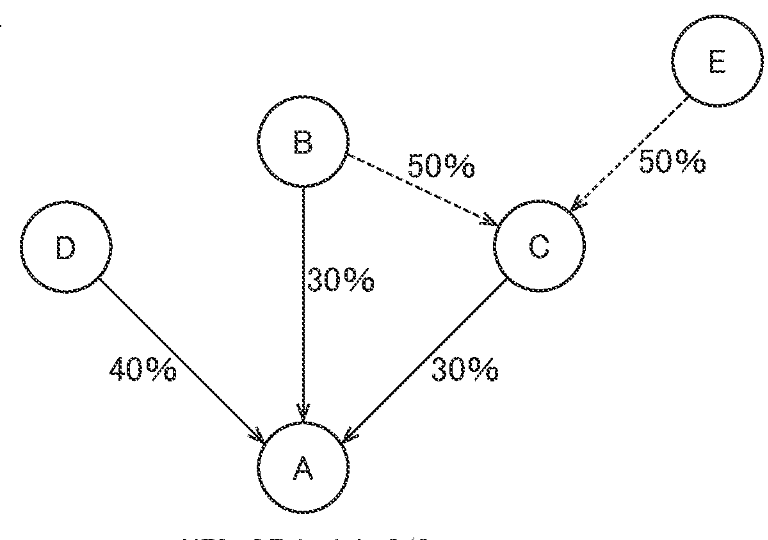
FIG. 5A is a diagram illustrating an exemplary conventional NPI calculation.
Figure 5B:
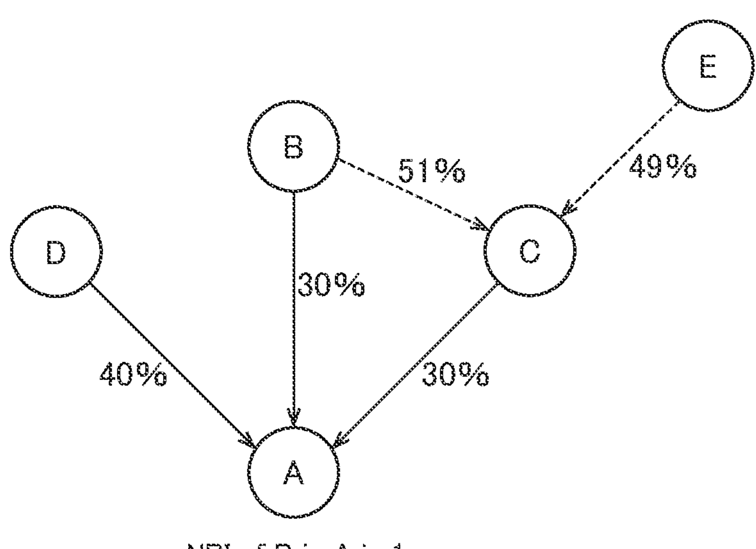
FIG. 5B is a diagram illustrating another exemplary conventional NPI calculation.

A description is given of a technique of calculating an inter-nodal influence level. FIG. 5A is a diagram illustrating an exemplary conventional NPI calculation. FIG. 5B is a diagram illustrating another exemplary conventional NPI calculation. In the example of FIG. 5A, entity B, entity C, and entity D own the shares of entity A. The shareholding ratios of entity B and entity C are 30%, and the shareholding ratio of entity D is 40%. In addition, entity B and entity E own the shares of entity C. The shareholding ratios of entity B and entity E are 50% respectively.

Since NPI-determining techniques are conventional art, detailed description thereof is omitted. The NPI of shareholder i in business j is given by formula (1) below.

Math. 1

$$NPI = \sum_{cj} pj(i|Cj)p(Cj), \tag{1}$$

where $pj(i|C_j)$ is the probability of shareholder i controlling business j.

Using this formula (1), the NPI of entity B in entity A in FIG. 5A is calculated to be ⅔.

Meanwhile, in FIG. 5B, the shareholding ratio of entity B in entity C is 51%, and the shareholding ratio of entity E in entity C is 49%. In this case, the NPI of entity B in entity A is calculated to be 1 because entity B has influential power over entity A via entity C.

When the NPI is 1 as in FIG. 5B, it is understand that entity B effectively controls entity A. Meanwhile, when the NPI is ⅔ as in FIG. 5A, it is difficult to describe in specific terms how much influential power this NPI value represents.

Figure 6A:
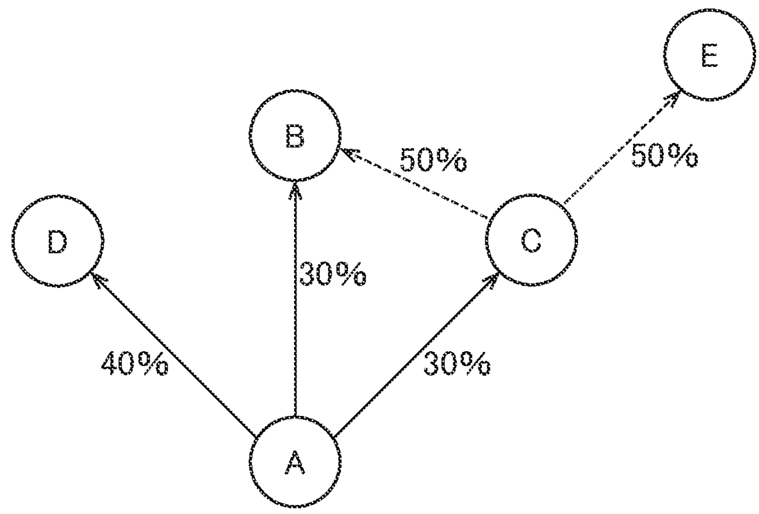
FIG. 6A is a diagram illustrating an exemplary indirect shareholding ratio calculation.
Figure 6B:
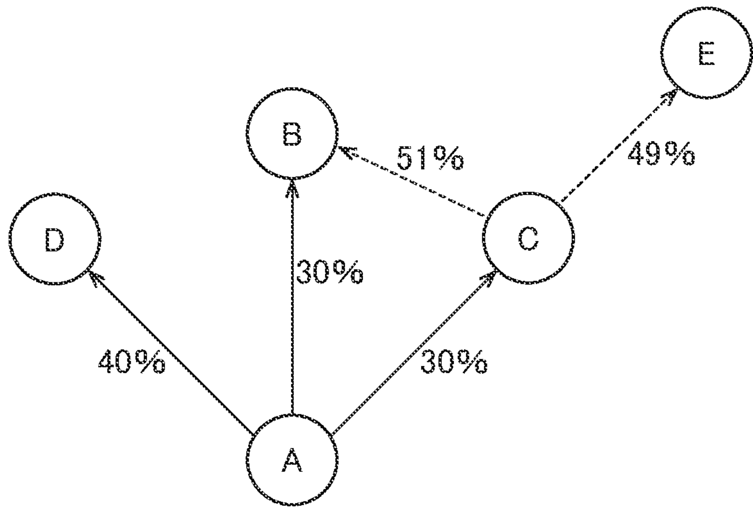
FIG. 6B is a diagram illustrating another exemplary indirect shareholding ratio calculation.

FIG. 6A is a diagram illustrating an exemplary indirect shareholding ratio calculation in accordance with the present embodiment. FIG. 6B is a diagram illustrating another exemplary indirect shareholding ratio calculation in accordance with the present embodiment. An indirect shareholding ratio is given by ISH (indirect shareholding) and is a value that indicates a direct or indirect influence level of an entity on another, particular entity in terms of a shareholding ratio. In the examples in FIGS. 6A and 6B, the particular entity is entity A. For instance, entity A is a particular business (company).

In the entity network in accordance with the present embodiment, unlike the NPI, entities are linked by directional edges from an entity that receives influence to an entity that gives influence. Entity A in the example in FIG. 6A has its shares owned by entities B, C, and D. The shareholding ratio of entity B in entity A is 30%. The shareholding ratio of entity C in entity A is 30%. The shareholding ratio of entity D in entity A is 40%.

Entity C has its shares owned by entity B and entity E. The shareholding ratio of entity B in entity C is 50%. The shareholding ratio of entity E in entity C is also 50%.

Therefore, entity B has direct influential power over entity A and additionally has indirect influential power over entity A via entity C. The indirect shareholding ratio ISH of entity B in entity A is hence equal to 45% (=30%+0.5×30%).

The example in FIG. 6B differs from the example in FIG. 6A in that the shareholding ratio of entity B in entity C is 51% and that the shareholding ratio of entity E in entity C is 49%.

In the example in FIG. 6B, entity C has its shares owned by entity B and entity E, and the shareholding ratio of entity B is 51%, which is in excess of 50%. An entity (e.g., business) that has a shareholding ratio in excess of 50% generally has the sole power to pass ordinary resolutions and can be the controlling shareholder. It is therefore analyzed that entity B effectively controls entity C.

In other words, the indirect shareholding ratio ISH of entity B in entity A can be regarded as being equal to 60% (=30%+1×30%) at maximum. Strictly, if the shareholding ratio of entity B in entity C is in excess of ⅔, there is no problem for entity B completely controls entity C. However, since 51% is not in excess of ⅔, the 30% that is the shareholding ratio of entity C is not completely at entity B's own will. Therefore, a variation example is also possible where entity B effectively controls only 51% of entity A, and the effective controlling power of entity E over entity A is calculated to be 9%, which is what remains after the subtraction of entity D's 40% and entity B's 51%. However, the indirect shareholding ratio ISH of entity B in entity A here is assumed to be 60% at maximum in the following discussion because it is often preferable to overestimate the threat of the influential power of entity B over entity A. This variation example will be described later in detail.

In the example in FIG. 5A, the NPI of entity B in entity A is ⅔. However, when the NPI is ⅔, it is difficult to describe what the influence level of entity B on entity A signifies.

Meanwhile, in the example in FIG. 6A, the indirect shareholding ratio ISH of entity B in entity A is 45%. An indirect shareholding ratio ISH is a value that represents an influence level that takes into account an indirect influence level denoted using a shareholding ratio as an index. In other words, entity B can be analyzed to have, on entity A, a direct or indirect influence level denoted using a shareholding ratio of 45% as an index. For instance, the users and clients of the OSINT system would find it difficult to intuitively appreciate what influence level an NPI value represents. On the other hand, the users and clients would find it easy to intuitively appreciate the influence level denoted by a shareholding ratio. Since the indirect shareholding ratio in accordance with the present embodiment is denoted by an influence level on the basis of a shareholding ratio, it is possible to present the influence level in an easy-to-appreciate form to the users and clients.

FIGS. 6A and 6B show examples of entity networks of a small number of entities. It is difficult to properly describe the influence level of an entity on another, particular entity even by an NPI-based technique, particularly, in a multilayered entity network of a large number of entities.

In contrast, by using the indirect shareholding ratio in accordance with the present embodiment, one can properly analyze, and present to users and clients in an easy-to-appreciate form, the influence level of an entity on another, particular entity even in a multilayered entity network of a large number of entities. Additionally, for a particular entity in a multilayered entity network, there may exist an entity substantially controlling the particular entity (substantially controlling entity) in addition to an ultimate controlling entity. It is difficult to analyze the influence level of a substantially controlling entity (e.g., a direct shareholder) by NPI techniques. In contrast, the technique in accordance with the present embodiment where the indirect shareholding ratio is used is capable of analyzing a substantially controlling entity.

2.2 Specific Example of Calculation of Indirect Shareholding Ratio

Example of Entity Network

Figure 7:
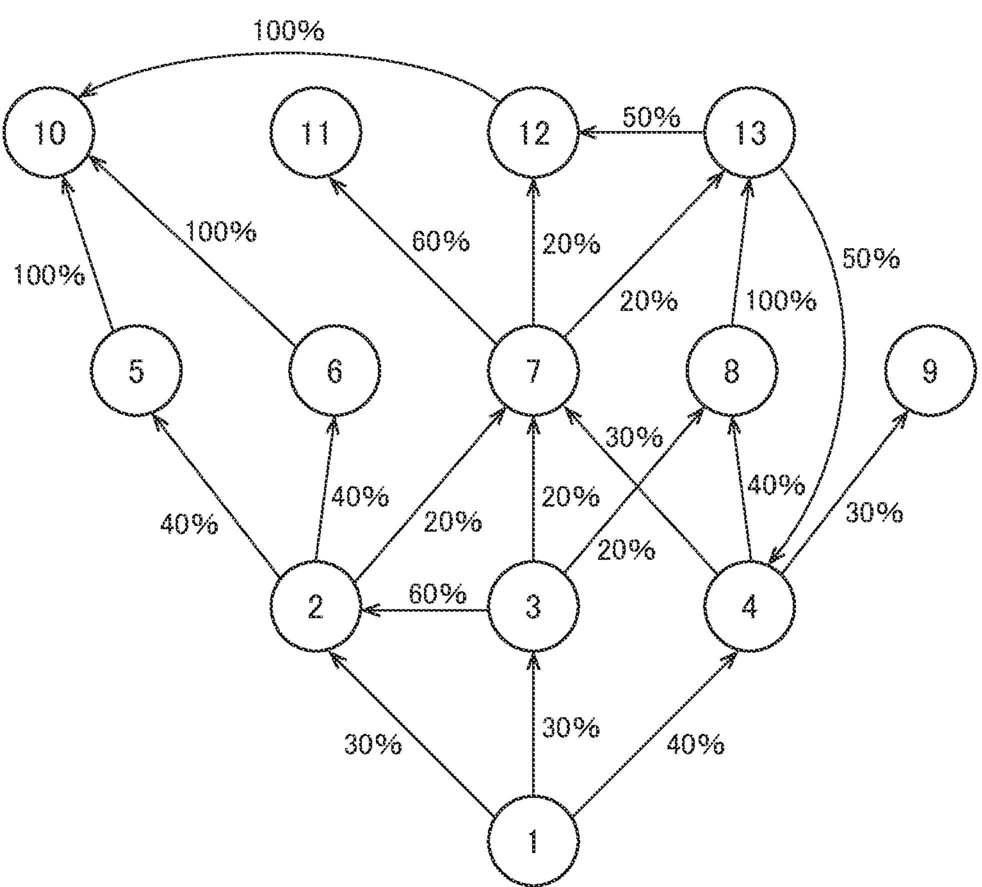
FIG. 7 is a diagram illustrating an exemplary entity network.

FIG. 7 is a diagram illustrating an exemplary entity network. The exemplary entity network in FIG. 7 includes nodes 1 to 13 each representing an entity. Two of these nodes are linked together by an edge on the basis of the mutual capital investment relation. The direction of the edge is from the entity that receives investment to the entity that makes the investment.

Additionally, each edge is assigned information on a shareholding ratio (capital contribution ratio). The information on each node, the information on each edge, and the information on each shareholding ratio can be obtained on the basis of, for example, the above-described open information. The entity network described here is obtained as the entity network 121 shown in FIG. 2.

In the technique of calculating an influence level by using an indirect shareholding ratio in accordance with the present embodiment, the influence level calculation unit 112 performs a process for calculating an influence level from a bottom node toward a higher node, where the bottom node is a particular node on which the influence level analysis is to be done. The bottom node corresponds to the particular node. The technique of calculating an influence level by using an indirect shareholding ratio is alternatively referred to as the bottom-up method.

Exemplary Influence Level Calculation Process Using Bottom-up Method

FIGS. 8 to 11 are diagrams illustrating exemplary influence level calculation processes using an indirect shareholding ratio. The following will describe examples where the entity network in FIG. 7 is used.

The influence level calculation unit 112, first, initializes a stack S and a path set P, which renders the stack S and the path set P empty sets.

In the following description, of the nodes in the entity network, the one of nodes 2 to 13 that is being processed other than node 1 (bottom node) will be referred to as the processed node. The processed node is a node linked directly or indirectly to the bottom node. The processed node corresponds to the analysis target node.

The stack S stores path information (weighted path) including information on the shareholding ratio assigned to the path running from node 1 (bottom node) to the processed node. The stack S is used to store a set of weighted paths.

When node 1 is linked indirectly to the processed node, there is a plurality of edges between node 1 and the processed node. In addition, when node 1 is linked directly to the processed node, there is a single edge between node 1 and the processed node. The one or more edges between node 1 and the processed node are referred to as paths in the present embodiment. Therefore, a path may include a single edge or a plurality of edges.

The path set P is used to store a set of weighted paths popped from the stack S. The influence level calculation unit 112 calculates an indirect shareholding ratio ISH using the set of weighted paths stored in the path set P. The stack S and the path set P are provided using, for example, a part of the memory area of the memory unit 120.

The influence level calculation unit 112 obtains node 1, which is a bottom node (particular node), from an entity network. The influence level calculation unit 112 then stores, in the stack S, a weighted path for each of nodes 2, 3, and 4 linked to node 1.

Figure 8:
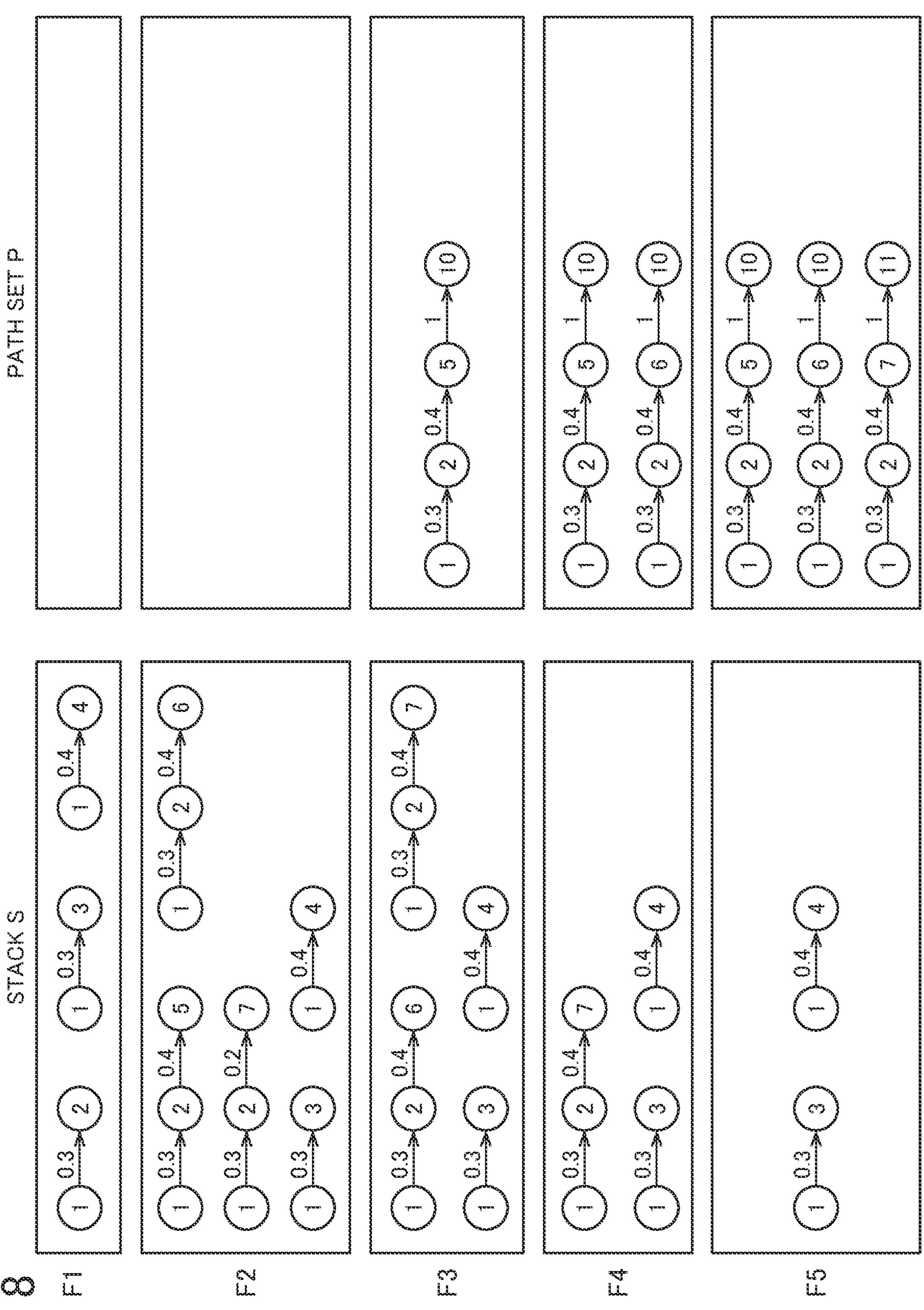
FIG. 8 is a diagram illustrating an exemplary influence level calculation process using an indirect shareholding ratio.

In the example of FIG. 8, the influence level calculation unit 112 stores, in the stack S, a weighted path for which the edge of the weighted path of the path from node 1 toward node 2 is assigned information ("0.3") on the shareholding ratio. The influence level calculation unit 112 performs the same process on the weighted path of the path from node 1 toward node 3 and on the weighted path of the path from node 1 toward node 4 and stores the resultant weighted paths in the stack S. FIG. 8 illustrates an example where the shareholding ratios are given in decimal numbers. Alternatively, the shareholding ratios may be given in percentage.

When the higher nodes for the bottom node or the processed node include a node with a shareholding ratio in excess of 50%, the influence level calculation unit 112 excludes the higher nodes other than this higher node from the processing target related to the processed node. For instance, when the plurality of higher nodes to which the processed node is directly linked includes a higher node that has a shareholding ratio in excess of 50% in the processed node, the influence level calculation unit 112 analyzes this higher node to be effectively controlling the processed node.

In such cases, the influence level calculation unit 112 rewrites the shareholding ratio of, among the plurality of higher nodes, the higher node that has a shareholding ratio in excess of 50% to 1, which is a maximum shareholding ratio. Additionally, the influence level calculation unit 112 excludes the one or more higher nodes other than that higher node from the processing target related to the processed node. The influence level calculation unit 112 performs the same process on the bottom node.

In the example of FIG. 7, nodes 2, 3, and 4 each have a shareholding ratio of less than 50% in node 1. Thus, the influence level calculation unit 112 stores node information on each node in the stack S. The stack S stores the three weighted paths shown in F1 in FIG. 8.

The influence level calculation unit 112 retrieves the top weighted path (weighted path from node 1 toward node 2) from the three weighted paths stored in the stack S. The influence level calculation unit 112 obtains three higher nodes (nodes 5, 6, and 7) for node 2 (processed node) from the entity network.

None of nodes 5, 6, and 7 has a shareholding ratio in excess of 50% in node 2. The influence level calculation unit 112 adds each of nodes 5, 6, and 7 to the weighted path running from node 1 to node 2. The influence level calculation unit 112 assigns information on the shareholding ratio corresponding to each of the edges that link node 2 to nodes 5, 6, and 7.

The influence level calculation unit 112 stores the weighted path running from node 1 to node 5, the weighted path running from node 1 to node 6, and the weighted path running from node 1 to node 7 in the stack S as shown in F2 in FIG. 8. No changes are made to the weighted path running from node 1 to node 3 and the weighted path running from node 1 to node 4 both stored in the stack S.

The influence level calculation unit 112 retrieves the weighted path running from node 1 to node 5 stored on the top of the stack S. When the one or more higher nodes to which the processed node is linked includes a higher node that has a shareholding ratio in excess of 50%, the influence level calculation unit 112 rewrites the shareholding ratio of this higher node to 1. Additionally, the influence level calculation unit 112 excludes the higher nodes other than that higher node from the processing target related to node 1.

As shown in the example in FIG. 7, node 5 has only one higher node, that is, node 10 with a shareholding ratio of 100%. In such cases, the influence level calculation unit 112 analyzes node 10 to be the node effectively controlling node 5 and assigns the shareholding ratio of 1 to the edge running from node 5 to node 10. The influence level calculation unit 112 then stores the weighted path of the path running from node 1 to node 10 via nodes 2 and 5 in the path set P. The resultant stack S and path set P are shown in F3 in FIG. 8.

The influence level calculation unit 112 retrieves the weighted path running from node 1 to node 6 stored on the top of the stack S. In the example of FIG. 7, similarly to node 5, node 6 is effectively controlled by node 10. The influence level calculation unit 112 stores the weighted path of the path running from node 1 to node 10 via nodes 2 and 6 in the path set P. The resultant stack S and path set P are shown in F4 in FIG. 8.

The influence level calculation unit 112 retrieves the weighted path running from node 1 to node 7 stored on the top of the stack S. As shown in the example in FIG. 7, node 7 is linked to nodes 11, 12, and 13 by respective edges. Of these three higher nodes (nodes 11, 12, and 13), node 11 has a shareholding ratio of in excess of 50% in node 7.

The influence level calculation unit 112 adds node 11 to the retrieved weighted path and rewrites the shareholding ratio for the edge linking node 7 to node 11 to 1. The influence level calculation unit 112 then stores the weighted path of the path running from node 1 to node 11 via node 2 and node 7 in the path set P. Additionally, the influence level calculation unit 112 excludes node 12 and node 13 from the processing target related to node 7. The resultant stack S and path set P are shown in F5 in FIG. 8.

Figure 9:
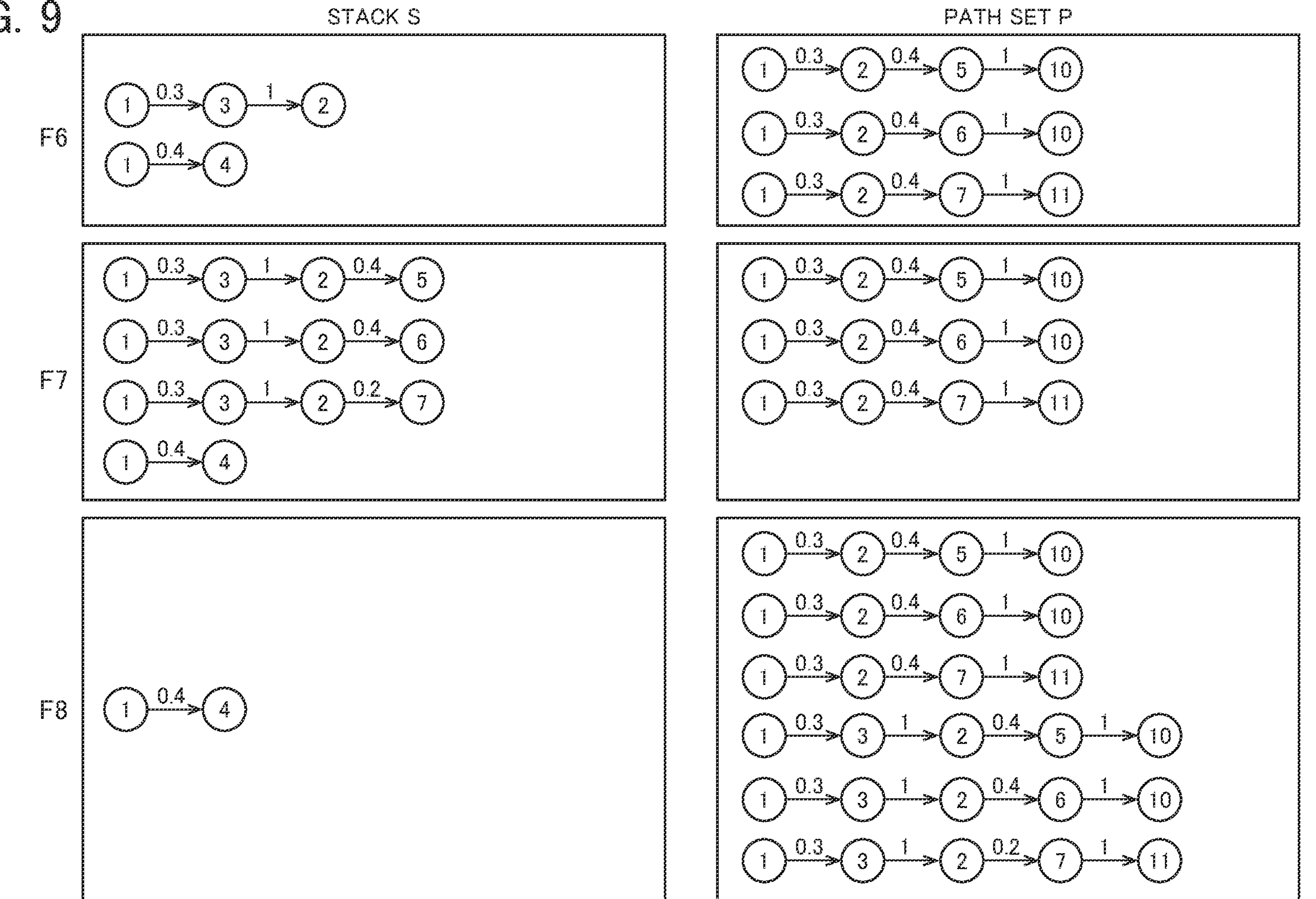
FIG. 9 is a continuation (diagram) to FIG. 8.

FIG. 9 is a continuation (diagram) to FIG. 8. The influence level calculation unit 112 retrieves the weighted path running from node 1 to node 3 stored on the top of the stack S. As shown in the example of FIG. 7, node 3 is linked to nodes 2, 7, and 8, and the shareholding ratio of node 2 in node 3 is in excess of 50%.

The influence level calculation unit 112 adds node 2 to node 3 and rewrites the shareholding ratio for the edge linking node 3 to node 2 to 1. The influence level calculation unit 112 then stores the weighted path of the path running from node 1 to node 2 via node 3 in the path set P. Additionally, the influence level calculation unit 112 excludes nodes 7 and 8 from the processing target related to node 3. The resultant stack S and path set P are shown in F6 in FIG. 9.

The influence level calculation unit 112 retrieves the weighted path running from node 1 to node 2 via node 3 stored on the top of the stack S. As shown in the example of FIG. 7, node 2 is linked to nodes 5, 6, and 7, and none of these nodes has a shareholding ratio of in excess of 50% in node 3.

The influence level calculation unit 112 adds nodes 5, 6, and 7 to the weighted path running from node 1 to node 2 via node 3, assigns respective shareholding ratios, and stores in the stack S. The resultant stack S and path set P are shown in F7 in FIG. 9.

The same process as the process described above is performed on nodes 5, 6, and 7. Thus, the weighted path of the path running from node 1 to node 5, the weighted path of the path running from node 1 to node 6, and the weighted path of the path running from node 1 to node 7, all stored in the stack S, are stored in the path set P. The resultant stack S and path set P are shown in F8 in FIG. 9.

Figure 10:
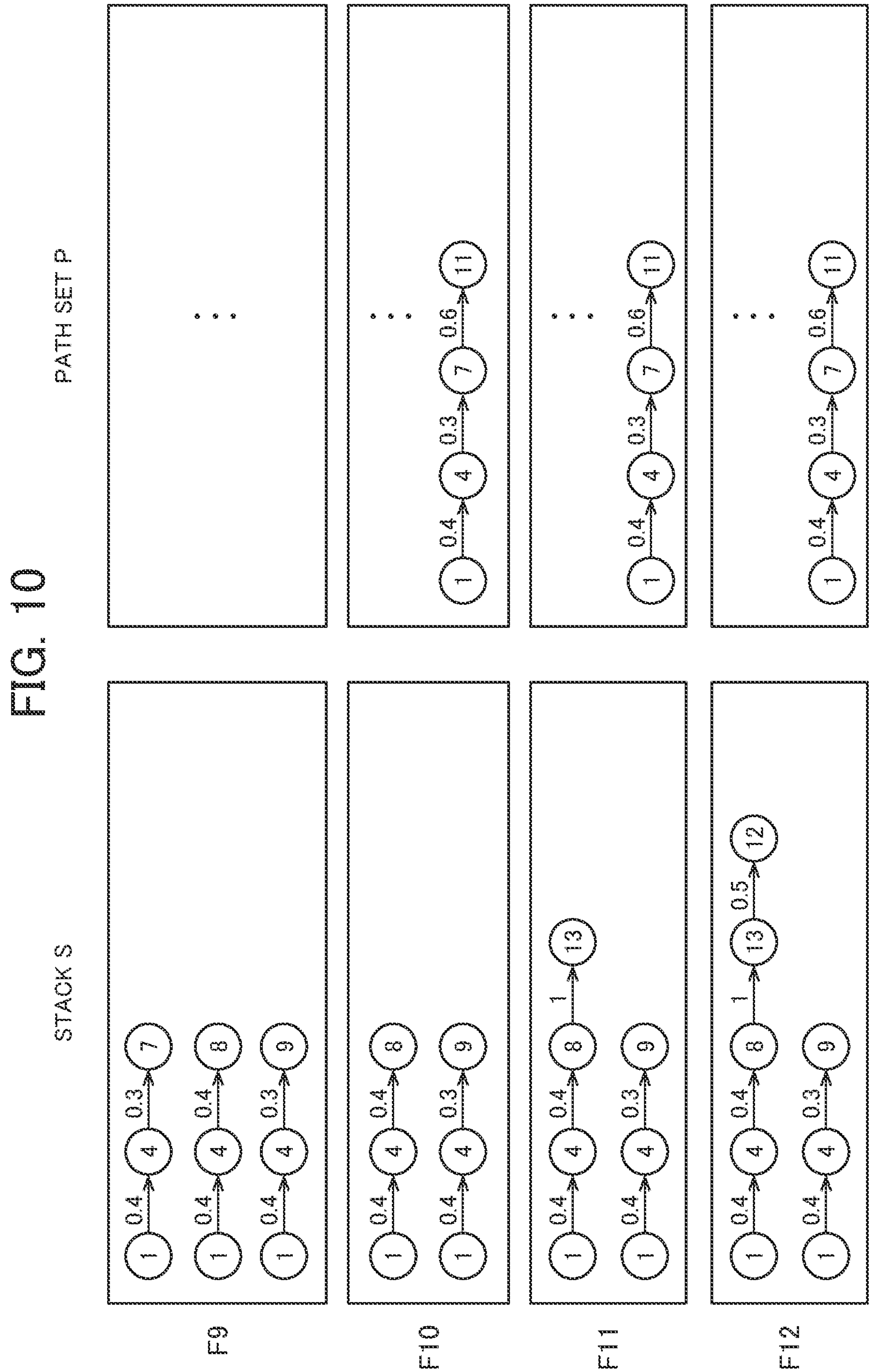
FIG. 10 is a continuation (diagram) to FIG. 9.

FIG. 10 is a continuation (diagram) to FIG. 9. Although the weighted paths stored in the path set P are not shown in F9 to F12 in FIG. 10, each weighted path corresponding to F8 shown in the example of FIG. 9 is stored in the path set P. The influence level calculation unit 112 performs the same process as the process described above. The resultant stack S and path set P are shown in F9 to F11 in FIG. 10.

Figure 11:
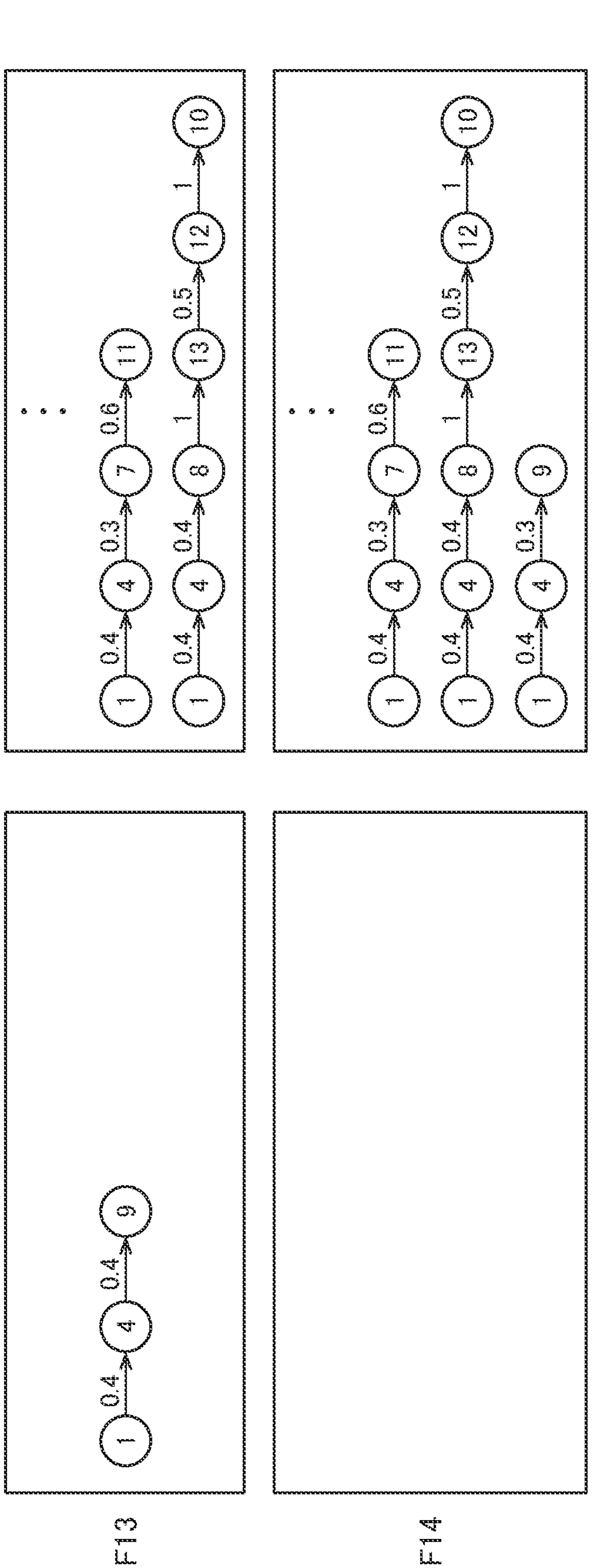
FIG. 11 is a continuation (diagram) to FIG. 10.

FIG. 11 is a continuation (diagram) to FIG. 10. Although the weighted paths stored in the path set P are not shown in F13 to F14 in FIG. 11, each weighted path corresponding to F8 shown in the example of FIG. 9 is stored in the path set P. In F13 in FIG. 11, the influence level calculation unit 112 retrieves the weighted path of the path linking node 1 to node 9 via node 2 from the stack S. The influence level calculation unit 112 then stores this weighted path in the path set P. This renders the stack S empty. The influence level calculation unit 112 ends the influence level calculation process here.

FIG. 12 is a diagram illustrating an exemplary method of calculating an indirect shareholding ratio. The path set P contains nine weighted paths X1 to X9 as a result of the above-described process. The influence level calculation unit 112 calculates an indirect shareholding ratio ISH using each weighted path X1 to X9.

A description is now given of an example where the indirect shareholding ratio, ISH(2,1), of node 2 in node 1 is calculated. Note that in the indirect shareholding ratio ISH (2,1), 2 represents node 2, and 1 represents node 1. The same convention is used throughout the following description. Node 1 is linked to node 2 by paths X1 to X3 and paths X4 to X6. Paths X1 to X3 share the same route from node 1 to node 2, and paths X4 to X6 share the same route from node 1 to node 2.

Paths X1 to X3 link node 1 directly to node 2. The shareholding ratio assigned to the edge linking node 1 to node 2 along this route is 0.3.

Meanwhile, paths X4 to X6 link node 1 indirectly to node 2 via node 3. The shareholding ratio assigned to the edge linking node 1 to node 3 is 0.3, and the shareholding ratio assigned to the edge linking node 3 to node 2 is 1. The influence level calculation unit 112 multiplies the plurality of shareholding ratios assigned to the indirect paths. In this case, the result of the multiplication is 0.3 (=0.3×1).

The influence level calculation unit 112 adds 0.3, which is the shareholding ratio for the path related to X4 to X6, to 0.3, which is the shareholding ratio for the path related to X1 to X3. Hence, the influence level calculation unit 112 calculates the indirect shareholding ratio, ISH(2,1), of node 2 in node 1 to be equal to 0.6.

A description is given next of an example where the indirect shareholding ratio, ISH(3,1), of node 3 in node 1 is calculated. Of weighted paths X1 to X9 in the example of FIG. 12, only paths X1 to X3 link node 1 to node 2. Therefore, the influence level calculation unit 112 calculates the indirect shareholding ratio, ISH(3,1), of node 3 in node 1 to be equal to 0.3.

The same description applies to the other nodes. The influence level calculation unit 112 thus calculates the indirect shareholding ratios ISH of all the nodes to which node 1 (bottom node) is directly or indirectly linked. FIG. 12 shows the indirect shareholding ratios ISH of all the nodes.

Here, the influence level calculation unit 112 may detect a node that has an indirect shareholding ratio ISH in excess of a prescribed threshold value. The prescribed threshold value may be set to any value. For instance, when the prescribed threshold value is set to 0.5, the influence level calculation unit 112 detects nodes 2 and 10.

On the basis of the entity network in the example of FIG. 7, detected node 10 can be determined to have ultimate controlling power. Additionally, detected node 2 indicates the highest indirect shareholding ratio of all the nodes. It is therefore determined that detected node 2 has effective controlling power over node 1.

Figure 13:
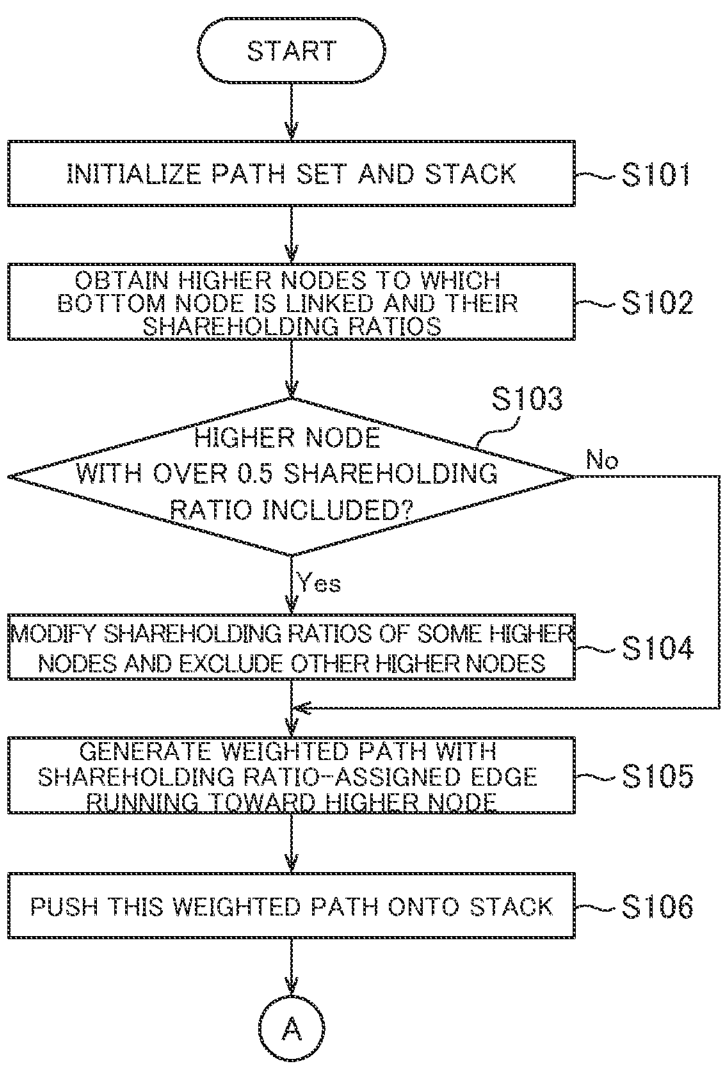
FIG. 13 is a flow chart representing an exemplary flow of an influence level calculation process using a bottom-up method.

FIG. 13 is a flow chart representing an exemplary flow of an influence level calculation process using a bottom-up method. The influence level calculation unit 112 initializes the path set P and the stack S (step S101). The influence level calculation unit 112 obtains each higher node to which the bottom node is linked and the shareholding ratio assigned to each path (step S102). Letting $n_1$ denote the bottom node, each higher node and each shareholding ratio are given by (2) below. Note that "n" represents the node represents, and the "q" represents shareholding ratio.

Math. 2

$$\text{Higher Nodes: } n_1^1, n_1^2, \ldots n_1^{N(1)}, \text{ Shareholding Ratios: } q_1^1, q_1^2, \ldots q_1^{N(1)} \quad (2)$$

The influence level calculation unit 112 determines whether or not the higher nodes to which the bottom node is linked include a higher node that has a shareholding ratio in excess of 50% (step S103). Upon determining "Yes" in step S103, the influence level calculation unit 112 performs a process of modifying the shareholding ratio of the higher node that has a shareholding ratio in excess of 50% and a process of excluding the higher nodes other than this higher node from the processing target (step S104). Specifically, the influence level calculation unit 112 performs the process (3) below by designating the higher node for which the shareholding ratio is to be modified as a modification target higher node.

Math. 3

Rewrite Shareholding Ratio $$q_l^k,$$

of Modification Target Higher Node $$n_l^k$$

to 1, and

Exclude Higher Nodes Other Than $$n_l^k (3)$$

The influence level calculation unit 112, upon determining "No" in step S103, proceeds to perform step S105. In this case, step S104 is not performed. In the example of FIG. 7, the influence level calculation unit 112 determines "No" in step S103 and proceeds to perform step 105.

The influence level calculation unit 112 generates weighted paths for each of which an edge from the bottom node toward a higher node is assigned a shareholding ratio (step S105). If step S104 is performed, a single weighted path is generated. The weighted paths are given by (4) below.

Math. 4

$$\text{Weighted paths: } n_1 \xrightarrow{q_1^1,} n_1^1 \ldots n_1 \xrightarrow{q_{1,}^{N(1)}} n_l^{N(1)}, \quad (4)$$

The influence level calculation unit 112 pushes the one or more weighted paths generated in step S105 onto the stack S (step S106). The influence level calculation unit 112 performs step S106 and subsequently proceeds from "A" to step S107 shown in FIG. 14.

FIG. 14 is a continuation (flow chart) to FIG. 13. The influence level calculation unit 112 obtains the top weighted path from the stack S (step S107). The obtained weighted path is referred to as weighted path x. Weighted path x is given by (5) below.

Math. 5

$$\text{Weighted Path } x = n_1 \xrightarrow{q} \cdots \xrightarrow{q} n_k \quad (5)$$

The influence level calculation unit 112 determines whether or not the highest node $n_k$ is a shareholder in obtained weighted path x (step S108). The influence level calculation unit 112, upon determining "Yes" in step S108, pushes weighted path x obtained in step S107 onto the path set P (step S109). The highest node $n_k$ in this case is a node corresponding to the ultimate controlling entity. Thereafter, the influence level calculation unit 112 proceeds to perform step S116.

The influence level calculation unit 112, upon determining "No" in step S108, proceeds to perform step S110. The influence level calculation unit 112 obtains one or more higher nodes to which a processed node $n_k$ is linked and the shareholding ratio(s) for the higher node(s), where the processed node is the highest node $n_k$ of obtained weighted path x (step S110). The one or more higher nodes to which the processed node $n_k$ is linked and the shareholding ratio(s) of the higher node(s) are given by (6) below.

Math. 6

$$\text{Higher Nodes: } n_k^1, n_k^2, \ldots n_k^{N(k)}, \text{ Shareholding Ratios: } q_k^1, q_k^2, \ldots q_k^{N(k)} \quad (6)$$

The influence level calculation unit 112 determines whether or not the higher nodes to which the processed node $n_k$ is linked include a higher node that has a shareholding ratio in excess of 50% (step S111). The influence level calculation unit 112, upon determining "Yes" in step S111, performs a process of modifying the shareholding ratio of the higher node that has a shareholding ratio in excess of 50% and a process of excluding the higher node from the processing target (step S112). Specifically, the influence level calculation unit 112 performs the process (7) below by designating the higher node for which the shareholding ratio is to be modified as a modification target higher node.

Math. 7

Rewrite Shareholding Ratio $$q_l^k$$

of Modification Target Higher Node $$n_l^k$$

to 1, and

Exclude Higher Nodes Other Than $$n_l^k (7)$$

If step S112 has been performed, the influence level calculation unit 112 rewrites the remaining higher nodes and the shareholding ratios of these higher nodes as one or more higher nodes to which the processed node $n_k$ is linked and the shareholding ratios related to the higher nodes. On the other hand, the influence level calculation unit 112, upon determining "No" in step S111, proceeds to perform step S113. In this case, the influence level calculation unit 112 does not rewrite the one or more higher nodes to which the processed node $n_k$ is linked and the shareholding ratio(s) of the higher node(s).

If there is a circulation node, the influence level calculation unit 112 performs a process of excluding the circulation node (step S113). Specifically, if the one or more higher nodes to which the processed node $n_k$ is linked includes weighted path x obtained in step S107, the influence level calculation unit 112 excludes this weighted path x. In other words, the influence level calculation unit 112 excludes a weighted path running from a higher node toward a lower node. In the example of FIG. 7, the path linking node 13 to node 4 is excluded.

A description is given of the process of excluding a circulation node. Suppose, as an example, that higher node Y owns shares in lower node X and also that lower node X owns shares in higher node Y. Suppose further that higher node Y has a shareholding ratio of Yq in lower node X and that lower node X has a shareholding ratio of Xq in higher node Y. In such a case, the indirect shareholding ratio of higher node Y in lower node X is given by $Xq+Yq\times Xq+Yq\times Xq^2+Yq\times Xq^3+\ldots$.

"Yq×Xq" in this formula represents the controlling power that controls Y via the path via which Y is controlled by X. If the controlling power is accepted, a loop is created in the process, which will increase the process volume for the influence level calculation unit 112. The influence level calculation unit 112 therefore performs a process to exclude the circulation node.

If there is a circulation node, the influence level calculation unit 112 excludes the circulation node and rewrites the one or more higher nodes to which the processed node $n_k$ is linked and the shareholding ratio(s) of the higher node(s). If there is no circulation node, the influence level calculation unit 112 does not rewrite the one or more higher nodes to which the processed node $n_k$ is linked and the shareholding ratio(s) of the higher node(s).

The influence level calculation unit 112 adds a node and a shareholding ratio to the one or more higher nodes to which the processed node $n_k$ is linked (step S114). Hence, weighted path x is updated as in (8) below.

Math. 8

$$\text{Weighted Path } x = n_1 \xrightarrow{q} \cdots \xrightarrow{q'} n_k, \cdots, n_1 \xrightarrow{q} \cdots \xrightarrow{q'} n_k \xrightarrow{q_k^{N(k)}} n_k, \quad (8)$$

The influence level calculation unit 112 pushes updated weighted path x into the path set P (step S115). The influence level calculation unit 112 determines whether or not the stack S has become empty (step S116). The influence level calculation unit 112 takes the process back to step S107 upon determining "No" in step S116 and proceeds to perform step S117 upon determining "Yes" in step S116. In other words, step S107 to step S116 are performed until the stack S becomes empty.

The influence level calculation unit 112 obtains each weighted path contained in the path set P and calculates the indirect shareholding ratio ISH of each node in the bottom node in the entity network (step S117). Specifically, the influence level calculation unit 112 obtains all weighted paths contained in the path set P and defines the set of the obtained weighted paths as $P(n_k)$.

The influence level calculation unit 112 then calculates the indirect shareholding ratio, ISH(k,1), of node $n_k$ in node $n_1$ by using formula (9) below.

$$ISH(k, 1) = \sum_{p \in p(nk)} \{\text{Product of Shareholding Ratios Assigned to Edges Contained in } p\} \quad (9)$$

The indirect shareholding ratios ISH shown in the example in FIG. 12 are obtained in this manner. After performing step S117, the influence level calculation unit 112 ends the influence level calculation process using a bottom-up method.

Presentation Process

The indirect shareholding ratio ISH of each node in the entity network is obtained as described in the foregoing. The presentation processing unit 113 may cause, via the communications unit 130, the display unit 240 of the terminal device 200 to display the entity network and the indirect shareholding ratios.

Figure 15:
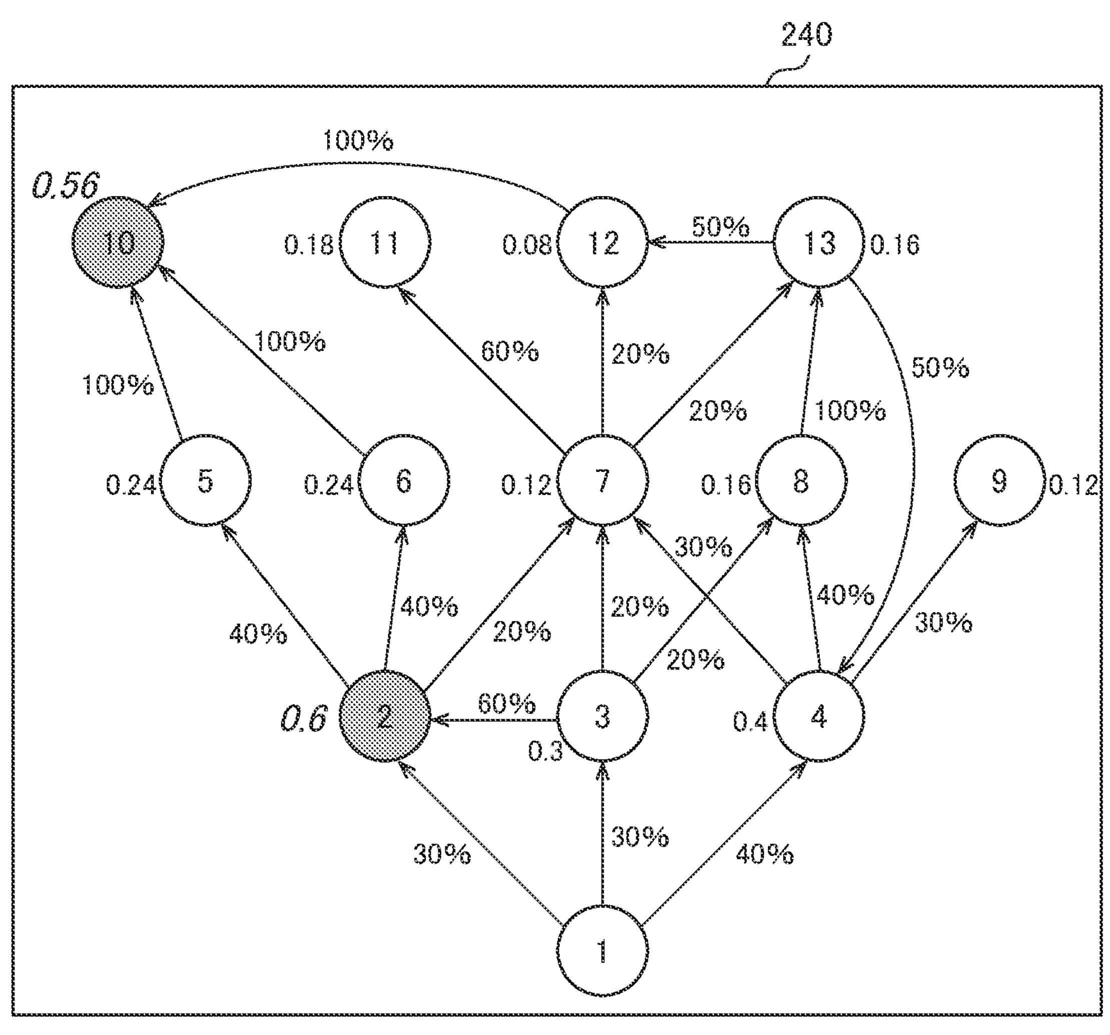
FIG. 15 is a diagram showing an exemplary presentation screen.

FIG. 15 is a diagram showing an exemplary presentation screen. The presentation processing unit 113 generates a screen showing each node in the entity network, the shareholding ratios assigned to the paths linking the nodes, and the indirect shareholding ratios ISH added to the respective nodes. The presentation processing unit 113 then controls to cause the display unit 240 of the terminal device 200 to display the generated screen.

Suppose, as an example, that the user operating the terminal device 200 has operated requesting a display of indirect shareholding ratios by using the operation unit 250. Upon the operation unit 250 receiving this operation, the processing unit 210 controls to transmit the request for a display of indirect shareholding ratios to the server system 100 via the communications unit 230.

The presentation processing unit 113 generates the above-described screen in response to the reception of the above-described request. The presentation processing unit 113 then transmits the generated screen to the terminal device 200 as a response and causes the display unit 240 of the terminal device 200 to display the generated screen. Hence, the influence level of each node in the entity network on node 1 can be visually presented to the user operating the terminal device 200.

The presentation processing unit 113 may cause the display unit 240 of the terminal device 200 to display a screen emphasizing the one or more nodes that have an indirect shareholding ratio greater than or equal to a prescribed threshold value. The prescribed threshold value may be set to any value. For instance, when the prescribed threshold value is 0.5, the presentation processing unit 113 may generates a screen emphasizing nodes 2 and 10, which have indirect shareholding ratios in excess of 0.5.

In this manner, information on those nodes that have high influence levels on node 1 can be presented to the user operating the terminal device 200 with good visibility. Alternatively, the presentation processing unit 113 may display emphasizing an indirect shareholding ratio corresponding to a node that has a high influence level. In this manner, information on the indirect shareholding ratio of a node that has a high influence level can be presented to the user operating the terminal device 200 with good visibility. The form of emphasis of nodes and indirect shareholding ratios is not limited to the screen example in FIG. 15.

Example of Influence Level Calculation Process where Control Propagation is Taken into Account A description is given next of an influence level calculation process where control propagation is taken into account. A technique using control propagation may be referred to as a top-down method. The influence level calculation unit 112 may apply a technique using control propagation (top-down method) to a technique using the indirect shareholding ratio described above (bottom-up method).

Figure 16:
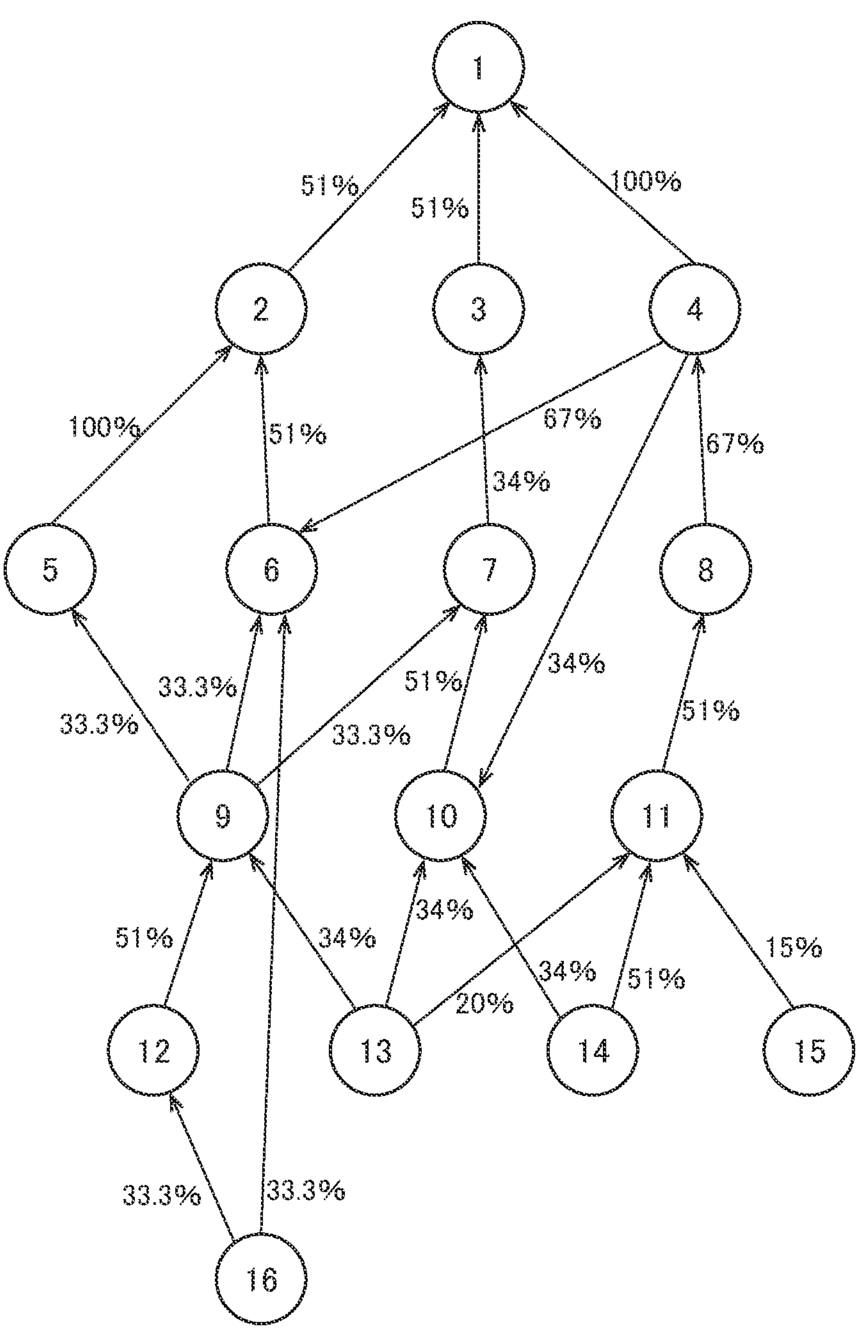
FIG. 16 is a diagram illustrating another exemplary entity network.

FIG. 16 is a diagram illustrating another exemplary entity network. The entity network in the example of FIG. 16 includes nodes 1 to 16. The highest node is node 1. The entity network in the example of FIG. 16 differs from the entity network in the example of FIG. 7. In other words, node 1 to node 13 in the example of FIG. 16 differ from node 1 to node 13 in the example of FIG. 7.

The influence level calculation unit 112 obtains a plurality of nodes that traces edges that have a shareholding ratio greater than or equal to a prescribed value u, starting at the highest node. The prescribed value a has a range of $0<\alpha<1$. The entity network in the example of FIG. 16 shows a plurality of lower nodes to which node 1 (highest node) is directly or indirectly linked.

The lower nodes not linked to the highest node (node 1) are not subjected to the top-down method for this highest node. For instance, node 12 is only linked to node 9 and has an indirect shareholding ratio of 51%. Therefore, although there is another node that owns shares in node 12, this other node is not directly or indirectly linked to node 1. The other node is hence not shown in the example of FIG. 16.

For instance, by setting the prescribed value a to meet $\alpha\geq0.5$, a plurality of nodes that is effectively controlled by node 1 can be identified in the entity network in the example of FIG. 16. Suppose, as an example, that $\alpha=0.5$. Of the nodes in the example of FIG. 16, nodes 7, 9, 10, 12, and 13 are not found on the paths that trace edges that have a shareholding ratio greater than or equal to the prescribed value u. Therefore, the influence level calculation unit 112 excludes nodes 7, 9, 10, 12, and 13 from the nodes and obtains the other nodes.

A typical entity network includes a large number of entities (nodes) and increasingly frequently includes a huge number of them. Therefore, the number of nodes to be processed by the technique using control propagation is preferably reduced before performing an influence level calculation process using the indirect shareholding ratio described above.

Accordingly, the influence level calculation unit 112 may perform an influence level calculation process using a bottom-up method only after narrowing down the nodes to be processed by a top-down method. The nodes to which the control of the highest node poorly propagates can be excluded from the influence level calculation process without seriously affecting the precision of the influence level calculation process. The influence level calculation unit 112 performs an influence level calculation process using a bottom-up method only after narrowing down the processing targets, which are the nodes of the entity network, by using a top-down method. In this manner, the influence level calculation process can be performed with a reduced process volume, but with high precision.

The prescribed value a is preferably less than 0.5 (less than half the maximum value of a) because many nodes in the entity network will be eliminated if the prescribed value a is excessively large. More preferably, $\alpha=1/3$.

When $\alpha=1/3$, it is possible to restrain excessively many nodes in the entity network from being eliminated and also to restrain the effect of the reduced process volume of the influence level calculation process from decreasing.

Figure 17:
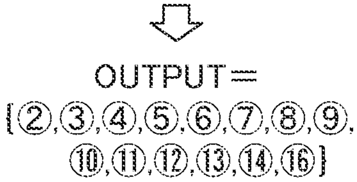
FIG. 17 is a diagram illustrating an exemplary node outputted by a top-down method.

Suppose, as an example, that $\alpha=0.5$ in the example of FIG. 16. In this case, nodes 7, 9, 10, 12, 13, and 15 are eliminated. Therefore, the outputted nodes are those nodes that are shown in the example of FIG. 17 when $\alpha=0.5$. Suppose, as another example, that $\alpha=1/3$ in the example of FIG. 16. In this case, only node 15 is eliminated. Therefore, the outputted nodes are those nodes that are shown in the example of FIG. 17 when $\alpha=1/3$. The nodes in the example of FIG. 17 are obtained as a result of executing the flow chart in FIG. 18 below.

It is understood from the description here that the effect of reducing the process volume in the case where $\alpha=1/3$ is lower than the effect of reducing the process volume in the case where $\alpha=0.5$, but higher than the effect of reducing the process volume in the case where no top-down method is applied.

Figure 18:
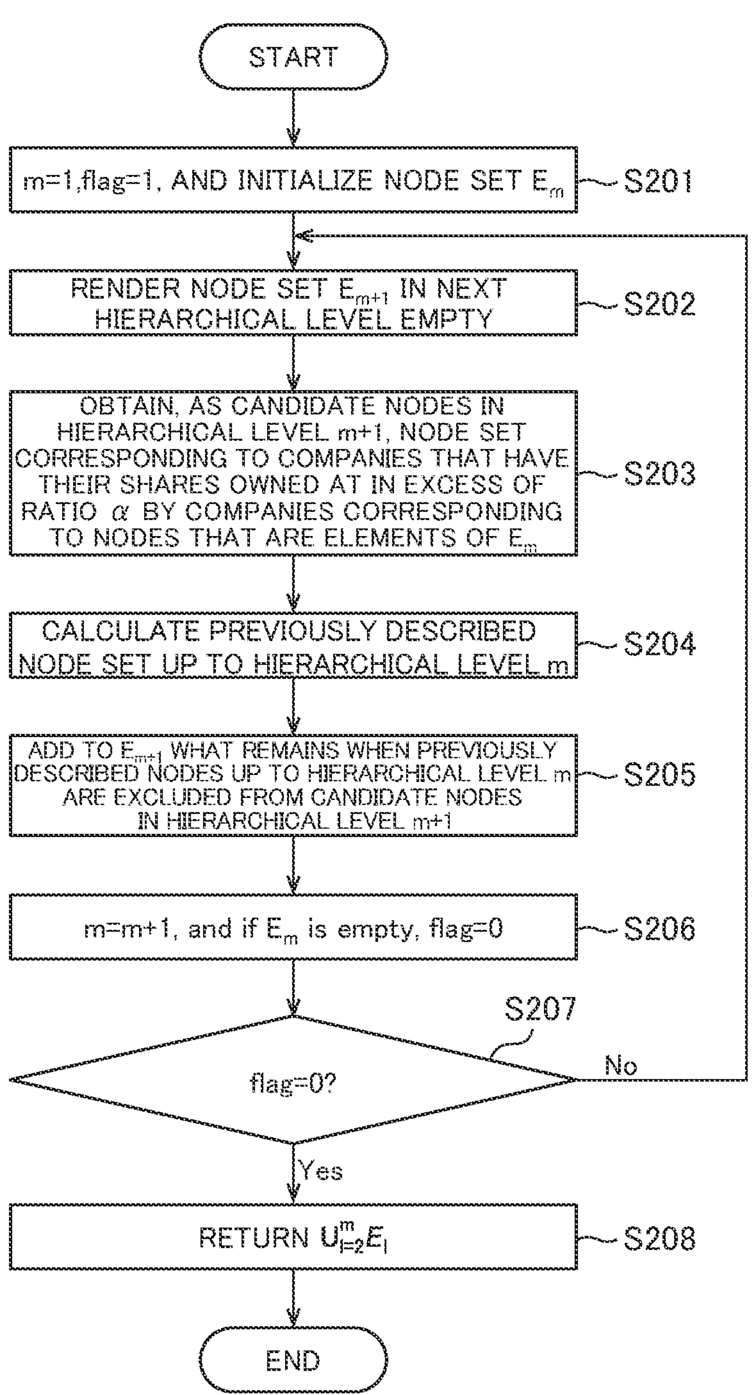
FIG. 18 is a flow chart representing an exemplary flow of a top-down method.

FIG. 18 is a flow chart representing an exemplary flow of a process of implementing a technique using control propagation. The influence level calculation unit 112 initializes the node set in the highest level (step S201). Here, as shown in FIG. 16, the node set in each hierarchical node level in the entity network is referred to as node set $E_m$. The influence level calculation unit 112 makes settings, "m=1" and "flag=1," in step S201. The flag assumes either a value of 0 or a value of 1.

The influence level calculation unit 112 renders node set $E_{m+1}$ in a next hierarchical level ((m+1)-th hierarchical level) empty (step S202). In this case, the influence level calculation unit 112 makes a setting, $E_{m+1}=\varphi$.

The influence level calculation unit 112, for hierarchical level $E_m$, obtains m+1 candidate nodes in a hierarchical level, which are companies (entities) having their shares owned by companies (entities) corresponding to the nodes that are elements of hierarchical level $E_m$, at shareholding ratios in excess of a (step S203). Specifically, the influence level calculation unit 112 obtains the nodes defined in (10) below and performs step S203. The nodes defined in (10) are the "m+1 candidate nodes in a hierarchical level."

Math. 10

Of the nodes representing companies having their shares owned by the company represented by each element $$n_m^k \text{ of } E_m, \text{ where } E_m = \{n_m^1, n_m^2, \ldots n_m^{N(m)}\}$$

those nodes corresponding to companies having their shares owned by $$n_m^k$$

at a shareholding ratio in excess of α are $$\{n_m^k(1, \alpha) \ldots n_m^k(l_{n_m^k}, \alpha)\}.$$

The node set obtained by combining $$\{n_m^k(1, \alpha) \ldots n_m^k(l_{n_m^k}, \alpha)\} \text{ for all } n_m^k$$

as the m+1 candidate nodes in a hierarchical level. (10)

Next, the influence level calculation unit 112 calculates the previously described nodes up to hierarchical level $E_m$ in accordance with (11) below (step 204).

Math. 11

Set of previously described nodes up to hierarchical level $$m = \bigcup_{l=1}^{m} E_l \tag{11}$$

The influence level calculation unit 112 adds, to $E_{m+1}$, the set of nodes that remain when the previously described nodes up to hierarchical level m obtained in step S204 are excluded from the m+1 candidate nodes in a hierarchical level obtained in step S203 (step S205).

The influence level calculation unit 112 increments m (m=m+1), and if $E_m$ is empty, makes a setting, flag=0 (step S206).

The influence level calculation unit 112 determines whether or not flag=0 (step S207). The influence level calculation unit 112, upon determining "No" in step S207, takes the process back to step S202.

If the flag is 0, the influence level calculation unit 112 determines "Yes" in step S207. In this case, the influence level calculation unit 112 returns the node set (12) below (step S208). The influence level calculation unit 112 then ends implementing the flow chart in FIG. 18.

Math. 12

Node set returned in step $$S208 = \bigcup_{l=2}^{m} E_l \tag{12}$$

As described in the foregoing, the process can be streamlined by the influence level calculation unit 112 reducing the number of nodes to be processed using a top-down method in performing an influence level calculation process using a bottom-up method.

Figure 19A:
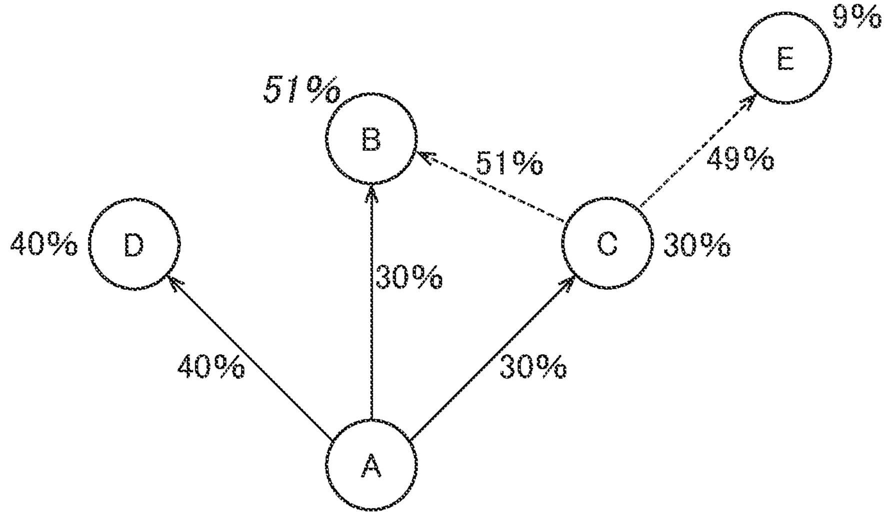
FIG. 19A is a diagram illustrating an exemplary indirect shareholding ratio calculation in accordance with a variation example.

A description is given next of a variation example with reference to FIG. 6B. The influence level calculation unit 112 may change the technique of calculating the indirect shareholding ratio ISH when a given entity has its shares owned by another entity at a shareholding ratio in excess of ⅔. In the case of the example in FIG. 19A, entity B has a shareholding ratio in excess of 50%, but not in excess of ⅔, in entity C. In such a case, the influence level calculation unit 112 may calculate the indirect shareholding ratio ISH of entity B in entity A by additionally taking into account the indirect shareholding ratio of another entity. In the case of the example in FIG. 19B, the influence level calculation unit 112 may calculate, as the indirect shareholding ratio ISH of entity E in entity A, "9%" which remains when "40%," which is the indirect shareholding ratio of entity D, and "51%," which is the indirect shareholding ratio of entity B, are subtracted.

Figure 19B:
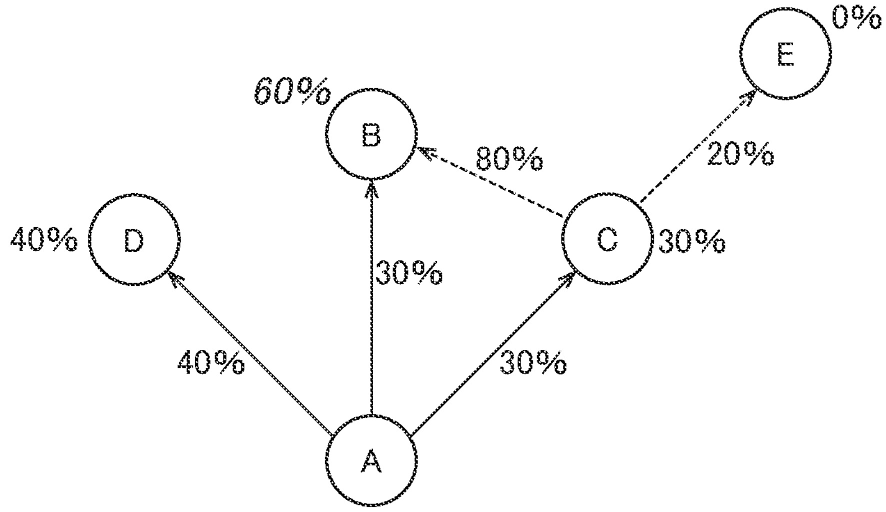
FIG. 19B is a diagram illustrating another exemplary indirect shareholding ratio calculation in accordance with a variation example.

In the case of the example in FIG. 19B, entity B has a shareholding ratio of 80%, which is in excess of ⅔, in entity C. In such a case, entity B can be analyzed to completely control entity C. Therefore, the influence level calculation unit 112 may, similarly to the example in FIG. 6B, calculate the indirect shareholding ratio ISH of entity B in entity A to be 60% (=30%+1×30%). In this case, the indirect shareholding ratio ISH of entity E in entity A is 0%.

The present embodiment has been discussed in detail. A person skilled in the art will readily appreciate that numerous modifications can be made without substantially departing from the new matter and effects of the present embodiment. Accordingly, all such modifications are included in the scope of the present disclosure. For example, terms that appear at least once in the description or drawings along with another broader or synonymous term can be replaced by the other term in any part of the description or drawings. Also, all the combinations of the present embodiment and the modifications are encompassed in the scope of the present disclosure. Also, the configuration and operation of the information processing system, server system, and terminal device, among others, are not limited to those described in the present embodiment, and various modifications can be made.

What is claimed is:

1. An information processing system comprising:

a communication unit configured to communicate with a terminal device;

a processor; and a memory including a computational Stack (S) for storing path information and managing node processing order and a Path Set (P) for storing influence level calculation result for each path, wherein:

the processor functions as:

an obtaining unit configured to obtain open information legally available and publicly accessible, generating an entity network data structure representing mutual capital investment relations and mutual capital contribution ratios among a plurality of nodes corresponding to a plurality of entities on the basis of the open information, and storing the entity network data structure in the memory;

an analysis unit configured to calculate an index indicating an influence level of a particular node of the plurality of nodes, in the entity network data structure stored in the memory, on a plurality of higher nodes to which the particular node is directly or indirectly linked based on at least one of the capital contribution ratios that is assigned to a path along which one of the capital investment relations from the particular node is traced; and a presentation processing unit configured to generate a screen showing the plurality of nodes and the index calculated by the analysis unit, wherein the analysis unit generates and stores in the computational Stack (S) a plurality of paths by connecting the plurality of nodes in the entity network from the particular node while modifying, when the capital contribution ratio of one higher node is in excess of half, the capital contribution ratio of the one higher node to a maximum ratio and excluding a higher node other than the one higher node from connecting target thereby minimizing the number of paths stored in the computational Stack (S), moves a path stored in the computational Stack (S) into the Path Set (P) when the path reaches the highest node in the entity network, and calculates the index based on the paths stored in the Path Set (P), and the communication unit transmits the screen generated by the presentation processing unit to the terminal device.

2. The information processing system according to claim 1, wherein when there is a plurality of capital contribution ratios for a path running from the particular node to the analysis target node, the analysis unit calculates a value indicating the influence level by multiplying this plurality of capital contribution ratios, and when there is a plurality of paths from the particular node to the analysis target node, the analysis unit calculates a value indicating the influence level by adding the plurality of capital contribution ratios of the plurality of paths.

3. The information processing system according to claim 1, wherein the analysis unit sets a maximum value of the capital contribution ratios to a value indicating the influence level on the analysis target node of the one higher node.

4. The information processing system according to claim 1, wherein the analysis unit excludes a path running from a higher node toward a lower node in analyzing the influence level.

5. The information processing system according to claim 1, wherein in analyzing the influence level, the analysis unit narrows a plurality of paths running from a highest node to a plurality of lower nodes to which the highest node is directly or indirectly linked down to a path the capital contribution ratio of which is larger than a prescribed value.

6. The information processing system according to claim 5, wherein the prescribed value is smaller than half a maximum value of the capital contribution ratios.

7. The information processing system according to claim 1, further comprising a display controlling unit configured to control to cause a display device to display a screen to which a value indicating the influence level analyzed has been added for each of the plurality of nodes in the entity network data structure.

8. The information processing system according to claim 1, wherein the presentation processing unit generates the screen emphasizing at least one of the plurality of nodes a value indicating the influence level of which is greater than or equal to a prescribed threshold value.

9. An information processing method comprising:

initializing a computational Stack (S) for storing path information and managing node processing order and a Path Set (P) for storing influence level calculation result for each path in a memory;

obtaining, by using a processor, open information legally available and publicly accessible, and generating an entity network on the basis of the open information representing mutual capital investment relations and mutual capital contribution ratios among a plurality of nodes corresponding to a plurality of entities, and storing the entity network in the memory;

calculating, by using the processor, an index indicating an influence level of a particular node of the plurality of nodes, in the entity network stored in the memory, on a plurality of higher nodes to which the particular node is directly or indirectly linked based on at least one of the capital contribution ratios that is assigned to a path along which one of the capital investment relations from the particular node is traced;

generating a screen showing the plurality of nodes and the calculated index; and transmitting the generated screen to a terminal device; wherein the calculating includes generating and storing in the computational Stack (S) a plurality of paths by connecting the plurality of nodes in the entity network from the particular node while modifying, when the capital contribution ratio of one higher node is in excess of half, the capital contribution ratio of the one higher node to a maximum ratio and excluding a higher node other than the one higher node from connecting target thereby minimizing the number of paths stored in the computational Stack (S), moving a path stored in the computational Stack (S) into the Path Set (P) when the path reaches the highest node in the entity network, and calculating the index based on the paths stored in the Path Set (P).

10. A non-transitory computer-readable storage medium storing a program for causing a computer to execute processing comprising:

initializing a computational Stack (S) for storing path information and managing node processing order and a Path Set (P) for storing influence level calculation result for each path in a memory;

obtaining open information legally available and publicly accessible, and generating an entity network on the basis of the open information representing mutual capital investment relations and mutual capital contribution ratios among a plurality of nodes corresponding to a plurality of entities, and storing the entity network in the memory;

calculating an index indicating an influence level of a particular node of the plurality of nodes, in the entity network stored in the memory, on a plurality of higher nodes to which the particular node is directly or indirectly linked based on at least one of the capital contribution ratios that is assigned to a path along which one of the capital investment relations from the particular node is traced;

generating a screen showing the plurality of nodes and the calculated index; and transmitting the generated screen to a terminal device; wherein the calculating includes generating and storing in the computational Stack (S) a plurality of paths by connecting the plurality of nodes in the entity network from the particular node while modifying, when the capital contribution ratio of one higher node is in excess of half, the capital contribution ratio of the one higher node to a maximum ratio and excluding a higher node other than the one higher node from connecting target thereby minimizing the number of paths stored in the computational Stack (S), moving a path stored in the computational Stack (S) into the Path Set (P) when the path reaches the highest node in the entity network, and calculating the index based on the paths stored in the Path Set (P).

11. The information processing system according to claim 1, wherein the entity network data structure represents mutual capital investment relations and mutual capital contribution ratios among a plurality of entities forming a globally complex, multilayered entity network, wherein the analysis unit implements a bottom-up graph traversal method by dynamically generating and storing in the memory the computational Stack (S) and the Path Set (P), wherein said modifying and excluding reduce computational steps for influence level calculation and reduce total number of calculation paths stored in the memory, and wherein the screen is further configured to receive the calculated index values from the analysis unit, and output a visualization of the entity network data structure which visually presents the influence level and visually distinguishes the substantially controlling entity within the multilayered entity network.

* * * * *